US009621813B2

(12) United States Patent
Hanzawa et al.

(10) Patent No.: US 9,621,813 B2
(45) Date of Patent: Apr. 11, 2017

(54) IMAGE DISPLAY APPARATUS, METHOD OF CONTROLLING IMAGE DISPLAY APPARATUS, IMAGE DISPLAY PROGRAM, AND COMPUTER READABLE RECORDING MEDIUM RECORDING THE SAME

(71) Applicant: OMRON Corporation, Kyoto-shi, Kyoto (JP)

(72) Inventors: Yuki Hanzawa, Nara (JP); Atsushi Irie, Nara (JP); Motoo Yamamoto, Kyoto (JP); Hiroyuki Tanaka, Shiga (JP); Shun Sakai, Shiga (JP); Tatsuya Murakami, Osaka (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 14/228,041

(22) Filed: Mar. 27, 2014

(65) Prior Publication Data

US 2014/0307147 A1  Oct. 16, 2014

(30) Foreign Application Priority Data

Apr. 15, 2013 (JP) .................................. 2013-085138

(51) Int. Cl.
*H04N 5/262* (2006.01)
*H04N 5/232* (2006.01)

(52) U.S. Cl.
CPC ..... *H04N 5/23296* (2013.01); *H04N 5/23293* (2013.01); *G03B 2205/0046* (2013.01)

(58) Field of Classification Search
None
See application file for complete search history.

(56) References Cited

U.S. PATENT DOCUMENTS

| 2005/0041111 | A1* | 2/2005 | Matsuoka | .......... H04N 5/23296 |
| | | | | 348/207.99 |
| 2006/0075448 | A1* | 4/2006 | McAlpine | ............. G01S 3/7864 |
| | | | | 725/105 |
| 2011/0304749 | A1* | 12/2011 | Ishikawa | ............ H04N 5/23296 |
| | | | | 348/240.1 |

(Continued)

FOREIGN PATENT DOCUMENTS

| CN | 102281398 A | 12/2011 |
| CN | 102668535 A | 9/2012 |

(Continued)

OTHER PUBLICATIONS

Examination Report issued in corresponding Korean Application No. 10-2014-0032562, mailed on Jul. 2, 2015 (8 pages).

(Continued)

*Primary Examiner* — Twyler Haskins
*Assistant Examiner* — Wesley Chiu
(74) *Attorney, Agent, or Firm* — Osha Liang LLP

(57) ABSTRACT

An image display apparatus configured to zoom display an image to be displayed on a display area has a position specifying unit that specifies a position of an object contained in a displayed image, a position deciding unit that decides a positional relationship between an outer frame of the display area and the position of the object, and a zoom speed changing unit that changes a zoom speed in the zoom display depending on the decided positional relationship.

18 Claims, 16 Drawing Sheets

(56) References Cited

U.S. PATENT DOCUMENTS

| | | | | |
|---|---|---|---|---|
| 2012/0105647 A1* | 5/2012 | Yoshizumi | ............ | G03B 17/38 |
| | | | | 348/169 |
| 2012/0133822 A1* | 5/2012 | Kawai | .................... | G02B 7/282 |
| | | | | 348/347 |
| 2014/0267834 A1* | 9/2014 | Aoki | .................. | H04N 5/23296 |
| | | | | 348/240.1 |
| 2015/0029347 A1* | 1/2015 | Tsubusaki | .......... | H04N 5/23296 |
| | | | | 348/208.1 |

FOREIGN PATENT DOCUMENTS

| | | | |
|---|---|---|---|
| JP | H10-23313 | A | 1/1998 |
| JP | 2005-308836 | A | 11/2005 |
| JP | 2010-286679 | A | 12/2010 |
| JP | 2011-166306 | A | 8/2011 |
| JP | 2011-188172 | A | 9/2011 |
| JP | 2011-259285 | A | 12/2011 |
| KR | 2012-0038451 | A | 4/2012 |

OTHER PUBLICATIONS

Extended European Search Report issued in corresponding European Application No. 14158072.0, mailed on Oct. 21, 2014 (11 pages).

Office Action in counterpart Chinese Patent Application No. 201410125731.9 issued on Nov. 1, 2016 (21 pages).

* cited by examiner

IMAGE DISPLAY APPARATUS, METHOD OF CONTROLLING IMAGE DISPLAY APPARATUS, IMAGE DISPLAY PROGRAM, AND COMPUTER READABLE RECORDING MEDIUM RECORDING THE SAME

BACKGROUND

1. Field

The present invention relates to an image display apparatus for carrying out zoom processing over an image to be displayed on a display unit, a method of controlling the image display apparatus, an image display program, and a computer readable recording medium recording the same.

2. Related Art

Conventionally, there is known a digital image processing apparatus such as an image photographing apparatus configured to photograph a subject by an imaging device, thereby generating a digital image (for example, a digital still camera) or an image display apparatus configured to display a digital image on a display unit (for example, an image viewer).

Moreover, some digital image processing apparatuses have a zoom function for increasing or reducing a subject contained in a digital image into an optional size. For example, the image photographing apparatus can photograph a subject in a desirable size by carrying out a zoom-in operation or a zoom-out operation. For instance, furthermore, the image display apparatus can increase or reduce, into a desirable size, a predetermined range of a digital image to be displayed (for example, a range including a subject).

Referring to the zoom function, conventionally, the following proposal is made, for example. In Japanese Unexamined Patent Publication No. 2011-166306 (published on Aug. 25, 2011), it is proposed to stepwise decrease a zoom speed toward a zooming target position based on a variation in a zoom position from a zooming initial position to the zooming target position.

In Japanese Unexamined Patent Publication No. 10-23313 (published on Jan. 23, 1998), moreover, it is proposed to change a view angle at a variable zoom speed depending on a variation in a size of a subject in automatic view angle control.

In Japanese Unexamined Patent Publication No. 2005-308836 (published on Nov. 4, 2005), furthermore, it is proposed to store a focal length (a zooming position) in last photographing and to decrease a speed for changing the focal length when a current focal length approximates to the stored focal length.

In the prior art described above, however, in some cases in which a user performs an operation for quickly setting image zooming to have a proper value, composition cannot be adjusted sufficiently properly, for example, a part of a subject unintentionally protrudes out of an area due to an excessive enlarging operation. For example, the techniques disclosed in the Japanese Unexamined Patent Publications Nos. 2011-166306, 10-23313 and 2005-308836 serve to carry out view angle control based on a variation in a size of a subject, a variation in a zooming position or a stored focal length and do not take a position of the subject into consideration.

SUMMARY

An image display apparatus according to one or more embodiments of the present invention is capable of properly controlling zoom processing depending on a position of a subject, a method of controlling the image display apparatus, an image display program and a computer readable recording medium recording the same.

An image display apparatus according to one or more embodiments of the present invention serves to zoom display an image to be displayed on a display area, and includes a position specifying unit configured to specify a position of an object contained in the displayed image, a position deciding unit configured to decide a positional relationship between an outer frame of the display area and the position of the object, and a zoom speed changing unit configured to change a zoom speed in the zoom display depending on the decided positional relationship.

A method of controlling an image display apparatus according to one or more embodiments of the present invention serves to zoom display an image to be displayed on a display area, and includes the steps of specifying a position of an object contained in the displayed image, deciding a positional relationship between an outer frame of the display area and the position of the object, and changing a zoom speed in the zoom display depending on the decided positional relationship.

The image display apparatus may be an imaging apparatus configured to pick up an image of a subject by an imaging device, thereby generating image data and to display the generated image data on a display unit or may be an image display apparatus configured to read image data and to display the image data on a display unit.

According to the structure, first of all, the positional relationship between the outer frame of the display area and the position of the object is decided. The display area may be a whole display unit such as a display or may be displayed in a window in a part of the display unit.

In the case in which the image display apparatus is implemented as an imaging apparatus, the zoom display may be carried out through optical zoom or by executing image data processing to digitally enlarge a displayed image.

The positional relationship between the outer frame of the display area and the position of the object can also be referred to as a distance relationship between the outer frame of the display area and the position of the object, for example. The position of the object can be based on a rectangular area (a detection frame) which is set in the detection of the object or can be based on a contour of the detected object.

Moreover, the decision of the positional relationship indicates a decision to be made as to whether the outer frame of the display area and the position of the object are close to each other or not, for example. As further exemplification, the decision of the positional relationship indicates a decision to be made as to where the position of the object is placed with respect to the outer frame of the display area.

In the decision of the positional relationship, for example, it is possible to use a distance calculated for a portion in which the outer frame of the display area and the detection frame or contour of the object are the closest to each other.

According to the structure, furthermore, it is possible to change the zoom speed in the zoom display depending on the decided positional relationship. The zoom speed can also be represented as a zoom amount per unit time. In addition, the zoom speed can also be represented as a zoom amount per unit operation. In the case in which the zoom speed is expressed in a magnification for enlarging a displayed image per operation, moreover, it may be referred to as a zoom magnification.

Accordingly, it is possible to increase or decrease the zoom speed in the zoom display depending on the decided positional relationship.

More specifically, in the case in which the position of the object is placed in the vicinity of the outer frame of the display area, for example, it is possible to decrease the zoom speed, thereby adjusting the object contained in the display screen to stay in the display area. In the case in which the position of the object is framed out to an outside of the outer frame of the display area by a predetermined distance, for example, it is also possible to increase the zoom speed, thereby returning the zoom speed into an original zoom speed.

Consequently, it is possible to produce an effect that proper zoom processing corresponding to the position of the object can be carried out.

In an image display apparatus according to one or more embodiments of the present invention, the position deciding unit decides whether or not the outer frame of the display area and the position of the object are close to each other in the display area as the positional relationship between the outer frame of the display area and the position of the object, and the zoom speed changing unit should decrease the zoom speed in the zoom display if the outer frame of the display area and the position of the object are close to each other.

According to the structure, in the case in which the position of the object is placed in the vicinity of the outer frame of the display area, the zoom speed can be decreased.

It is possible to decide whether the position of the object is placed in the vicinity of the outer frame of the display area depending on whether the position of the object approaches the outer frame of the display area within a predetermined distance, for example.

An amount of the decrease in the zoom speed may be stepwise or continuous. When the zoom display is carried out at a predetermined zoom speed so that the position of the object reaches the vicinity of the outer frame of the display area from a portion which is not placed in the vicinity of the outer frame of the display area, moreover, the predetermined zoom speed may be switched into another lower zoom speed. Furthermore, the decrease in the zoom speed also includes that the zoom speed is set to zero to stop the zoom display for a predetermined period.

According to the structure, in the case in which the position of the object is placed in the vicinity of the outer frame of the display area, it is possible to decrease the zoom speed, thereby adjusting the object contained in the display screen to stay in the display area.

In an image display apparatus according to one or more embodiments of the present invention, the zoom speed changing unit switches the zoom speed into a predetermined lower zoom speed if the outer frame of the display area and the position of the object are close to each other.

According to the structure, the switching into the lower zoom speed is carried out to decrease the zoom speed. Therefore, it is possible to give a user a time required for deciding whether the zoom is to be continued during the zoom display after the switching into the lower zoom speed.

In an image display apparatus according to one or more embodiments of the present invention, the zoom speed changing unit gradually decreases the zoom speed depending on the positional relationship between the outer frame of the display area and the position of the object.

According to the structure, it is possible to gradually decrease the zoom speed, thereby carrying out the zoom display. It is possible to give a user a time required for deciding whether the zoom is to be continued during the zoom display.

In an image display apparatus according to one or more embodiments of the present invention, the zoom speed changing unit sets the zoom speed to zero for a predetermined period.

According to the structure, it is possible to set the zoom speed to zero, thereby stopping the zoom display for the predetermined period. Therefore, it is possible to give a user a time required for deciding whether the zoom is to be continued during the stop of the zoom display.

In an image display apparatus according to one or more embodiments of the present invention, the zoom speed changing unit decreases the zoom speed in such a manner that the position of the object does not protrude from the outer frame of the display area when the position of the object protrudes from the outer frame of the display area when the zoom display is carried out at a predetermined zoom speed.

According to the structure, in the case in which the zoom display is carried out at the predetermined zoom speed, it is possible to decrease the zoom speed, thereby preventing the position of the object from protruding out of the outer frame of the display area when the position of the object protrudes from the outer frame of the display area.

In an image display apparatus according to one or more embodiments of the present invention, the position deciding unit decides whether or not the position of the object is separated from the outer frame of the display area by a predetermined distance at an outside of the display area as the positional relationship between the outer frame of the display area and the position of the object, and the zoom speed changing unit should increase the zoom speed in the zoom display if the position of the object is separated from the outer frame of the display area.

In the case in which the position of the object is separated from the outer frame of the display area, it is possible to decide that a user intends to continue the zoom display. In this case, it is desirable to increase the zoom speed, thereby carrying out the zoom display.

According to the structure, in the case in which the position of the object is separated from the outer frame of the display area, it is possible to increase the zoom speed which is decreased.

An image display apparatus according to one or more embodiments of the present invention includes an elapsed time deciding unit configured to decide whether a predetermined time passes since the decrease in the zoom speed or not, and the zoom speed changing unit increases the zoom speed in the zoom display if a predetermined time passes since the decrease in the zoom speed.

If the predetermined time passes since the decrease in the zoom speed, it is possible to decide that a user intends to continue the zoom display. In this case, it is desirable to increase the zoom speed, thereby carrying out the zoom display.

According to the structure, in the case in which the predetermined time passes since the decrease in the zoom speed, it is possible to increase the zoom speed which is decreased.

An image display apparatus according to one or more embodiments of the present invention includes a dividing unit configured to divide the display area into a plurality of divided areas in a predetermined composition, and the position deciding unit decides the position of the object in the divided areas.

The predetermined composition indicates a composition based on a three-division method, for example. According to the structure, the display area is divided into a plurality of divided areas in the predetermined composition. For instance, if the predetermined composition is based on the three-division method, the display area is divided into three equal parts for a horizontal direction and a vertical direction respectively so that nine divided areas are obtained.

Moreover, the position of the object may be decided on the basis of a center of gravity of the object or may be decided on the basis of the contour or detection frame of the object.

According to the structure, the position of the object in the divided areas is decided and the zoom speed in the zoom display is changed depending on a result. For the change in the zoom speed, it is possible to use the technique described above.

According to the structure, it is possible to change the zoom speed in the vicinity of a boundary between the divided areas in the zoom processing. Consequently, it is possible to decrease the zoom speed when the object is zoom displayed in a well-balanced position over the composition.

When the position of the object is placed in the well-balanced position over the composition by the zoom display, thus, it is possible to give a user a time required for deciding whether the zoom display is to be continued.

An image display apparatus according to one or more embodiments of the present invention serves to zoom display an image to be displayed on a display area, and includes a dividing unit configured to divide the display area into a plurality of divided areas in a predetermined composition, a position specifying unit configured to specify a position of an object contained in the displayed image, a position deciding unit configured to decide a positional relationship between a boundary between the divided areas and the position of the object, and a zoom speed changing unit configured to change a zoom speed in the zoom display depending on the decided positional relationship.

A method of controlling an image display apparatus according to one or more embodiments of the present invention serves to zoom display an image to be displayed on a display area, and includes the steps of dividing the display area into a plurality of divided areas in a predetermined composition, specifying a position of an object contained in the displayed image, deciding a positional relationship between a boundary between the divided areas and the position of the object, and changing a zoom speed in the zoom display depending on the decided positional relationship.

According to the structure, similarly, it is possible to change the zoom speed in the vicinity of the boundary between the divided areas in the zoom processing. Consequently, it is possible to decrease the zoom speed when the object is zoom displayed in a well-balanced position over the composition. Therefore, it is possible to produce an effect that proper zoom processing corresponding to the position of the object can be carried out.

An image display apparatus according to one or more of the embodiments of the present invention may be implemented by a computer. In this case, a control program of the image display apparatus which operates the computer as each unit provided in the image display apparatus to implement the image display apparatus through the computer, and a computer readable recording medium recording the same are within a scope of the present invention.

Moreover, imaging equipment including an imaging unit configured to pick up an image of a subject and the image display apparatus and serving to display, on the display area, an image obtained by the imaging unit are also within a scope of the present invention. For example, one or more embodiments of the present invention can be applied to a digital still camera or an information terminal with a camera (a notebook type PC, a tablet type PC or a smart phone).

An image display apparatus according to one or more embodiments of the present invention serves to zoom display an image to be displayed on a display area, and includes a position specifying unit configured to specify a position of an object contained in the displayed image, a position deciding unit configured to decide a positional relationship between an outer frame of the display area and the position of the object, and a zoom speed changing unit configured to change a zoom speed in the zoom display depending on the decided positional relationship.

Moreover, a method of controlling an image display apparatus according to one or more embodiments of the present invention serves to zoom display an image to be displayed on a display area, and includes the steps of specifying a position of an object contained in the displayed image, deciding a positional relationship between an outer frame of the display area and the position of the object, and changing a zoom speed in the zoom display depending on the decided positional relationship.

An image display apparatus according to one or more embodiments of the present invention serves to zoom display an image to be displayed on a display area, and includes a dividing unit configured to divide the display area into a plurality of divided areas in a predetermined composition, a position specifying unit configured to specify a position of an object contained in the displayed image, a position deciding unit configured to decide a positional relationship between a boundary between the divided areas and the position of the object, and a zoom speed changing unit configured to change a zoom speed in the zoom display depending on the decided positional relationship.

Furthermore, A method of controlling an image display apparatus according to one or more embodiments of the present invention serves to zoom display an image to be displayed on a display area, and includes the steps of dividing the display area into a plurality of divided areas in a predetermined composition, specifying a position of an object contained in the displayed image, deciding a positional relationship between a boundary between the divided areas and the position of the object, and changing a zoom speed in the zoom display depending on the decided positional relationship.

Therefore, it is possible to produce an effect that proper zoom processing corresponding to the position of the object can be carried out.

DETAILED DESCRIPTION

Embodiments of the present invention will be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

A first embodiment of the present invention will be described with reference to FIGS. 1 to 12. First of all, an imaging apparatus 1 according to the first embodiment will be described with reference to FIG. 1. Specifically, the imaging apparatus 1 can be implemented by a digital still camera, an information terminal with a camera (a notebook type PC, a tablet type PC or a smart phone) or the like. The imaging apparatus 1 illustratively has two operation modes including a photographing mode for carrying out photographing and an image browsing mode for browsing a photographed image.

Figure 1:
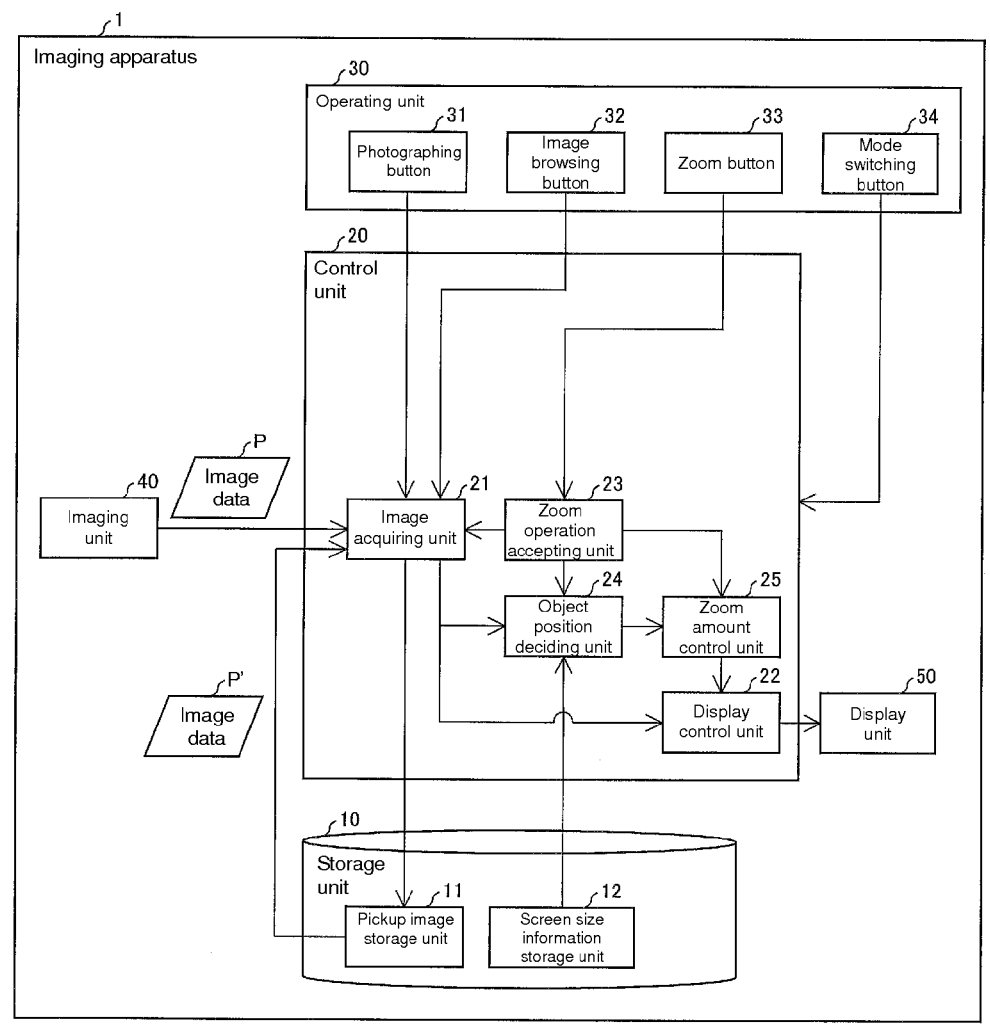
FIG. 1 is a functional block diagram showing a schematic structure of an imaging apparatus according to a first embodiment of the present invention.

As shown in FIG. 1, the imaging apparatus 1 includes a storage unit 10, a control unit 20, an operating unit 30, an imaging unit 40 and a display unit 50.

The storage unit 10 serves to store various data and programs therein. The storage unit 10 can be implemented by combining storage devices, for example, an ROM (Read Only Memory), an RAM (Random Access Memory), a nonvolatile memory (such as a flash memory), and the like. The details of the various data to be stored in the storage unit 10 will be described below.

The control unit 20 serves to totally control various functions in the imaging apparatus 1. The function of the control unit 20 can be implemented by execution of the program stored in the storage unit 10 or the like through a processing device such as a CPU (Central Processing Unit). For instance, the control unit 20 has a zoom control function. A structure for implementing the zoom control function by the control unit 20 will be described below.

The operating unit 30 serves to accept various inputs from a user and can be implemented by an inputting button to which each function is assigned, for example. The operating unit 30 is not restricted thereto but can be implemented by an optional input device. For instance, the operating unit 30 may be configured as a touch panel to implement a touch input in the display unit 50 which will be described below. The operating unit 30 generates an operation signal or operation data depending on an operation of the user which is accepted, and transmits the generated data to the control unit 20. The details of the operating unit 30 will be described below.

The imaging unit 40 serves to pick up an image of a subject by an imaging device, thereby generating image data P. Specifically, the imaging unit 40 is configured from an imaging lens, an imaging device, a frame memory, a mechanical mechanism, a motor, a flash and the like. Moreover, it is possible to employ a CCD (Charge Coupled Device), a CMOS (Complementary Metal Oxide Semiconductor) or the like as the imaging device. In addition, the imaging unit 40 may perform photographing depending on a photographing condition of the flash or the like in accordance with a photographing instruction given from the control unit 20, thereby generating the image data P. The imaging unit 40 supplies the generated image data P to the control unit 20.

The display unit 50 has a display area for carrying out screen display and serves to offer information to a user by screen display in the display area. The display unit 50 displays, on a display screen, various information such as a character or an image based on the screen data received from the control unit 20. The display unit 50 can be implemented by a display device such as an LCD (Liquid Crystal Display), a PDP (Plasma Display Panel) or an EL (Electroluminescence) display.

(Structure of Storage Unit)

More specifically, the storage unit 10 includes a pickup image storage unit 11 and a screen size information storage unit 12.

The image data P generated by the imaging unit 40 is stored in the pickup image storage unit 11. Although description will be given to the case in which the image data P generated by the imaging unit 40 is stored in the pickup image storage unit 11, the present invention is not restricted thereto. Optional image data can be stored in the pickup image storage unit 11. For example, a communication network and image data transferred from an external storage medium can be stored in the pickup image storage unit 11.

Screen size information indicative of a size of the display area in the display unit 50 is stored in the screen size information storage unit 12. The screen size information may be information (M by N) indicative of a vertical size of a screen and a horizontal size of the screen, for example.

(Structure of Operating Unit)

More specifically, the operating unit 30 includes a photographing button 31, an image browsing button 32, a zoom button 33 and a mode switching button 34.

The photographing button 31 is an operation button for performing photographing in the imaging unit 40 in the photographing mode.

The image browsing button 32 is an operation button configured to display, on the display unit 50, the image data stored in the pickup image storage unit 11 in the image browsing mode.

The zoom button 33 is an operation button configured to carry out zoom processing for an image to be displayed on the display area in the display unit 50.

The mode switching button 34 is an operation button configured to switch the operation mode between the photographing mode and the image browsing mode.

For convenience of explanation, description will be given to the case in which the operation mode is set to be the photographing mode by the mode switching button 34 insofar as there is no particular remark otherwise stated.

(Structure of Control Unit)

More specifically, the control unit 20 includes an image acquiring unit 21, a display control unit 22, a zoom operation accepting unit 23, an object position deciding unit 24 and a zoom amount control unit 25.

The image acquiring unit 21 acquires the image data P from the imaging unit 40. The image acquiring unit 21 continuously acquires the image data P generated in the imaging unit 40 and supplies the acquired image data P to the display control unit 22 and the object position deciding unit 24. When the photographing button 31 is operated, furthermore, the image acquiring unit 21 gives the imaging unit 40 an instruction for carrying out photographing. The image acquiring unit 21 acquires the image data P generated in the imaging unit 40 in response to the instruction and stores the acquired image data P in the pickup image storage unit 11.

The display control unit 22 controls screen display in the display unit 50. Specifically, the display control unit 22 generates screen data based on the image data P supplied from the image acquiring unit 21. The display control unit 22 sets, as screen data, data obtained by carrying out zoom processing over the image data P acquired by the image acquiring unit 21. The zoom processing may be carried out through optical zoom or digital zoom based on image data processing. In the case in which the zoom processing is carried out through the digital zoom, it is sufficient that the display control unit 22 executes enlargement processing over the image data in accordance with a zoom amount. In the case in which the zoom processing is carried out through the optical zoom, moreover, it is sufficient to employ a structure in which the display control unit 22 gives the imaging unit 40 an instruction for the zoom amount. For convenience of explanation, the digital zoom will be described below. The display control unit 22 supplies the generated screen data to the display unit 50.

The zoom operation accepting unit 23 accepts the zoom processing depending on an operation through the zoom button 33 (which will be hereinafter referred to as a zoom operation). When accepting the zoom processing, the image zoom operation accepting unit 23 gives the object position deciding unit 24 and the zoom amount control unit 25 a notice that the zoom processing is accepted.

When the zoom processing is accepted, the object position deciding unit 24 serves to detect an object from image data and to decide a position in a display area for the detected object based on screen size information stored in the screen size information storage unit 12.

If the object to be detected by the object position deciding unit 24 is an object whose position on a display area D can be specified, there is no particular limitation. The object position deciding unit 24 may set an object, for example, a human face, a human body or a landmark as a detection target. Moreover, the object position deciding unit 24 may automatically detect an object by image analysis for the image data P. Moreover, the object position deciding unit 24 may set, as the detection target, a detection target designated in advance by a user.

Moreover, the object position deciding unit 24 may set, as a position deciding target, only any of the detected objects which is selected by the user through the operation of the operating unit 30. The selection of the user may be accepted during photographing or in advance. The object position deciding unit 24 gives the zoom amount control unit 25 a notice of a decision result.

The zoom amount control unit 25 determines a zoom amount (or a zoom ratio or a zoom speed) based on a decision result of a position of an object at an inside or outside of the display area. The zoom amount control unit 25 supplies the determined zoom amount to the display control unit 22.

(Summary of Zoom Processing of Imaging Apparatus)

Figure 2:
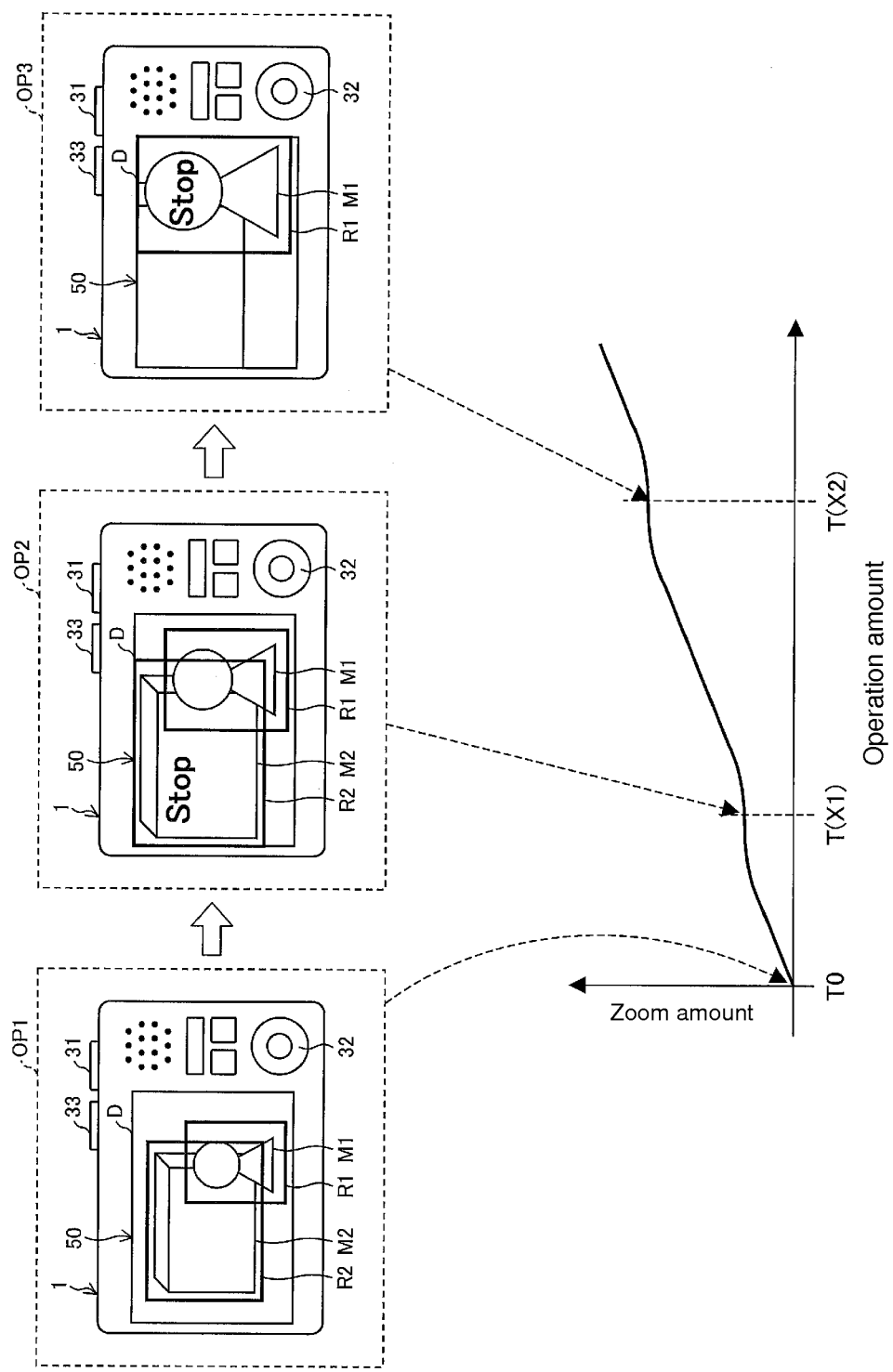
FIG. 2 is a graph showing a relationship of a zoom amount with an operation amount and a view showing display of a display unit on each point of the graph.

Next, summary of the zoom processing of the imaging apparatus 1 will be described with reference to FIG. 2. FIG. 2 is a graph showing a relationship of a zoom amount with an operation amount and a view showing display of the display unit 50 on each point of the graph. In the graph of FIG. 2, an axis of abscissa indicates the operation amount of a zoom operation and an axis of ordinates indicates the zoom amount. It is also possible to suppose that the axis of abscissa of the graph indicates a time base. For example, it is also possible to suppose that the axis of abscissa indicates a time that the zoom button is pressed down.

FIG. 2 depicts that the screen display area D in the display unit 50 is brought into states OP1, OP2 and OP3 when the operation amount of the zoom operation is T0, T(X1) and T(X2), respectively.

The state OP1 indicates an initial condition before execution of the zoom processing. The image data P transmitted from the imaging unit 40 is displayed as screen data in the rectangular display area D of the display unit 50. Although the display area D is illustratively configured as an oblong rectangle, the present invention is not restricted thereto. It is possible to employ an optional aspect ratio of the display area D.

The screen data displayed on the display area D (that is, the image data P) includes a person M1 and a landmark M2. The person M1 and the landmark M2 are detected by object detection processing in the object position deciding unit 24, and detected object areas (which may be referred to as detection frames) R1 and R2 are set to the person M1 and the landmark M2, respectively. The detected object areas R1 and R2 indicate that the detected object is present. Although the detected object areas R1 and R2 are illustratively set to take rectangular shapes including the object respectively, the present invention is not restricted thereto. The object position deciding unit 24 may detect the contour of the object and set the detected contour as a detected object area for the object. In the initial condition, the zoom amount is also zero with the operation amount T0=0.

The zoom button 33 is operated by the operation amount of T((X1) in the state OP1 so that a transition to the state OP2 is made. In the state OP2, the detected object area R2 of the landmark M2 overlaps with an outer frame of the display area D by the zoom processing.

Specifically, left and upper sides of the detected object area R2 of the landmark M2 almost overlap with parts of the left and upper sides of the outer frame of the display area D in the state OP2, respectively. With increase in the operation amount of the zoom processing from T0 to T(X1), the detected object area R2 of the landmark M2 approaches the outer frame of the display area D. When the detected object area R2 of the landmark M2 approaches the outer frame of the display area D, the imaging apparatus 1 gradually reduces the increase in the zoom amount with respect to a unit operation amount (a zoom speed:a gradient of the graph).

As a result, the increase in the zoom amount with respect to the unit operation amount is gradually reduced toward T(X1) when the operation amount is increased by a certain amount from T0 as shown in the graph of FIG. 2. In the vicinity of T(X1), the zoom speed is approximately zero. Moreover, the zoom speed may be set to zero to stop the zoom processing.

In the case in which a certain object approaches the outer frame of the display area D to stop the zoom processing, moreover, a sign ("Stop") indicating that the zoom processing is being stopped may be displayed on the screen area in addition to the object as shown in the state OP2 of FIG. 2. Also in the case in which the zoom speed is being decreased, the sign indicating that "the decrease in the zoom speed" is being carried out may be displayed, which is not shown.

Although the description has been given to that the imaging apparatus 1 gradually changes a variation in the zoom speed, the present invention is not restricted thereto. The zoom speed may be switched from a normal zoom speed to a lower zoom speed than the normal zoom speed depending on a positional relationship between the detected object area R2 of the landmark M2 and the outer frame of the display area D. The following description will be the same.

When the zoom button 33 is operated till the operation amount T (X2) in the state OP2, furthermore, a transition to the state OP3 is made. In the state OP3, the upper and right sides of the detected object area R1 of the person M1 almost overlap with parts of the right and upper sides of the outer frame of the display area D, respectively.

When the left and upper sides of the detected object area R2 of the landmark M2 are framed out from the display area D after T (X1), the zoom speed is gradually increased. As a result, the zoom speed is gradually increased with increase in the operation amount from the operation amount of T (X1) to a certain amount as shown in the graph of FIG. 2. When the operation amount is increased, furthermore, the zoom speed (that is, the gradient of the graph) is made constant. At this time, the zoom speed may be returned to an original zoom speed or may be set to be higher or lower than the original zoom speed.

When the upper and right sides of the detected object area R1 of the person M1 approach the outer frame of the display area D, moreover, the zoom speed is decreased to be almost zero in the vicinity of T (X2). As a result, the zoom speed is decreased to become almost zero in the vicinity of T (X2) when the operation amount approaches T (X2) as shown in the graph of FIG. 2. In other words, the zoom speed is gradually increased with the increase in the operation amount after T (X2).

In the above description, attention is mainly paid to a positional relationship between the upper side of the detected object area R1 and the upper side of the outer frame of the display area D. However, the present invention is not restricted thereto but a decision may be made for left, right and lower sides in addition to the upper side in the four sides.

Furthermore, the object position deciding unit 24 may decide the positional relationship for a side where a distance between the outer frame of the display area D and the detected object area R1 is the smallest. As described above, the positional relationship with the outer frame of the display area D may be decided every object when a plurality of objects is detected. This is the same for each specific example which will be described below.

Example 1

Next, a more detailed example of the zoom processing of the imaging apparatus 1 will be described with reference to FIGS. 3 to 5. In the present example, description will be given to switching of the normal zoom speed and the lower zoom speed.

Figure 3:
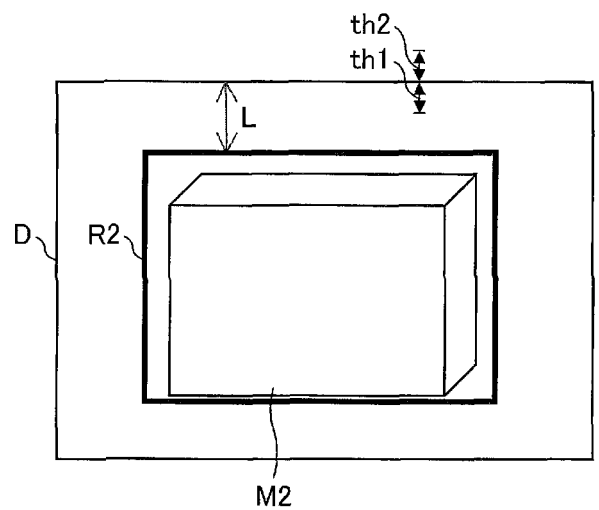
FIG. 3 is a view for explaining a positional relationship between a detected object area of a landmark contained in image data and an outer frame of a display area.

FIG. 3 is a view for explaining the positional relationship between the detected object area R2 of the landmark M2 and the outer frame of the display area D. FIG. 4 is a graph showing an example of the relationship of the zoom amount with the operation amount. Moreover, FIGS. 5A to 5C are other views for explaining the positional relationship between the detected object area R2 of the landmark M2 and the outer frame of the display area D.

In the present example, in the case in which the detected object area approaches a place separated from the outer frame of the display area D by a predetermined distance or less during the zoom operation, the zoom speed is switched into the lower zoom speed (deceleration). In the case in which the detected object area is framed out from the outer frame of the display area D by a predetermined distance or more during a further zoom operation, moreover, the zoom speed is switched into the normal zoom speed (acceleration). In the case in which a predetermined time passes during the further zoom operation, the zoom speed may be switched into the normal zoom speed (acceleration).

More specific description will be given as follows. In the following, the positional relationship shown in FIG. 3 is set into an initial condition of the zoom processing of the imaging apparatus 1, and description will be given by taking note of a positional relationship between the upper side of the detected object area R2 and the upper side of the outer frame of the display area D.

In the following description, a left upper part is set to be an origin (0, 0) in a coordinate system of the display area D. As shown in FIG. 3, a position in a vertical direction of the upper side of the detected object area R2 in the landmark M2 with respect to the upper side of the outer frame of the display area D is represented as L. In other words, L represents a distance between the upper side of the outer frame of the display area D and the upper side of the detected object area R2 of the landmark M2.

Moreover, an upper area than the upper side of the outer frame of the display area D represents a position with a negative sign attached thereto. In this case, L represents a negative value. Moreover, thresholds th1 (>0) and th2 (<0) shown in FIG. 3 define criteria of a positional relationship for execution of the deceleration/acceleration of the zoom processing. One of the thresholds th1 and th2 may be zero.

The foregoing is given for convenience of explanation and the present invention is not restricted thereto. It is possible to employ an origin, a coordinate system and expression of a position which are optional.

When the zoom operation is started, the upper side of the detected object area R2 and the upper side of the outer frame of the display area D approach each other by the zoom processing with increase in the operation amount. In other words, L shown in FIG. 3 is decreased with the increase in the operation amount. If L>th1 is set, the object position deciding unit 24 decides that a position in the display area of the detected object area R2 of the landmark M2 is not placed in the vicinity of the outer frame. Correspondingly, the zoom amount control unit 25 sets the zoom speed as a normal zoom speed. Accordingly, the zoom processing is carried out at the normal zoom speed in a section with an operation amount of T0 to T1 as shown in FIG. 4.

When the zoom operation is continuously carried out so that the operation amount reaches T1, furthermore, L=th1 is obtained as shown in FIG. 5A. When L<th1 is set, furthermore, the object position deciding unit 24 decides that the position in the display area of the detected object area R2 of the landmark M2 is placed in the vicinity of the outer frame. Correspondingly, the zoom amount control unit 25 sets the zoom speed as the lower zoom speed.

The section of T0 to T1 may be represented as "L≤th1". It is possible to optionally set any section to which a boundary value belongs. This is also the same in the following description.

When the zoom operation is continuously carried out, furthermore, L=0 is obtained as shown in FIG. 5B. At this time, the upper side of the detected object area R2 and the upper side of the outer frame of the display area D overlap with each other. When the zoom operation is continuously carried out, moreover, the vicinity of the upper side of the detected object area R2 starts to be framed out to the outside of the outer frame of the display area D (L is negative expression). The object position deciding unit 24 decides that the position at the outside of the display area of the detected object area R2 of the landmark M2 is placed in the vicinity of the outer frame if th2<L<0 is set. Correspondingly, the zoom amount control unit 25 sets the zoom speed as the lower zoom speed.

Figure 4:
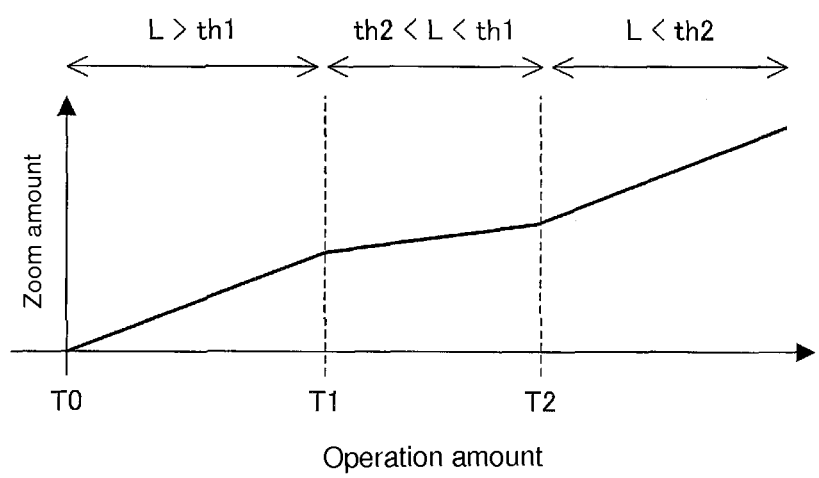
FIG. 4 is a graph showing an example of the relationship of the zoom amount with the operation amount.
Figure 5A:
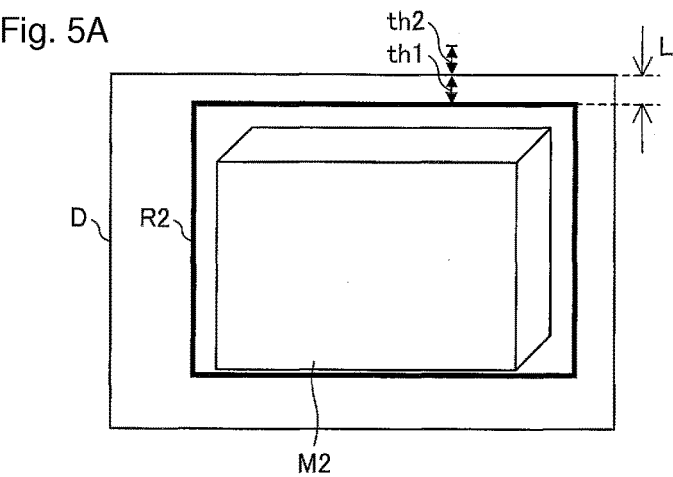
FIGS. 5A to 5C are other views for explaining the positional relationship between the detected object area of the landmark contained in the image data and the outer frame of the display area.
Figure 5B:
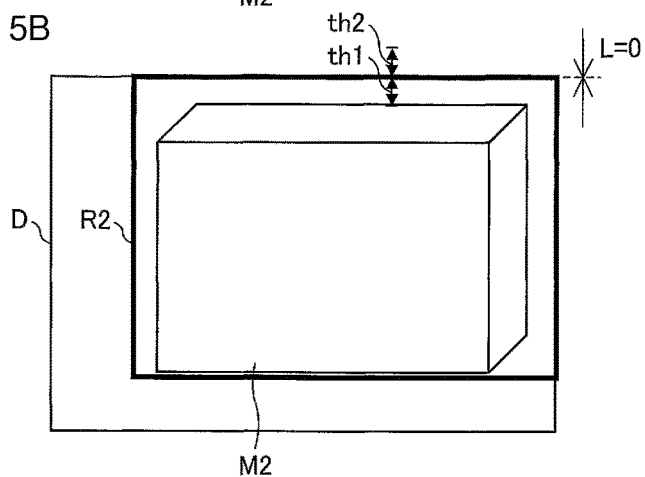
Figure 5C:
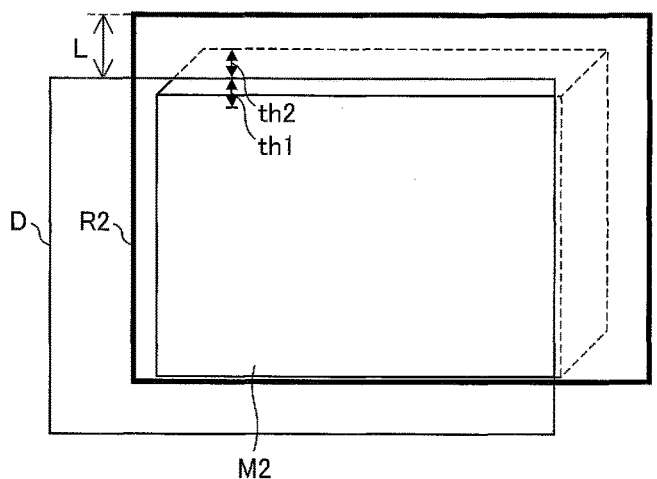

As described above, in a section with an operation amount of T1 to T2 (th2<L<th1) shown in FIG. 4, the zoom processing is carried out at the lower zoom speed.

When the operation amount is larger than T2 and L<th2 (<0) is obtained as shown in FIG. 5C, the object position deciding unit 24 decides that the position at the outside of the display area of the detected object area R2 of the landmark M2 is not placed in the vicinity of the outer frame. Correspondingly, the zoom amount control unit 25 sets the zoom speed as the normal zoom speed.

In a section of the operation amount T2 or more shown in FIG. 4, accordingly, the zoom processing is carried out at the normal zoom speed. In the case in which a certain time passes since the start of the deceleration (i.e. the start of the zoom processing at the lower zoom speed), the zoom amount control unit 25 may switch the zoom speed into the normal zoom speed. In the case in which the detected object area R2 is framed out from the display area to the outside by a predetermined amount and the certain time passes since the start of the deceleration, moreover, the zoom amount control unit 25 may switch the zoom speed into the normal zoom speed.

(Flow of Zoom Processing)

Figure 6:
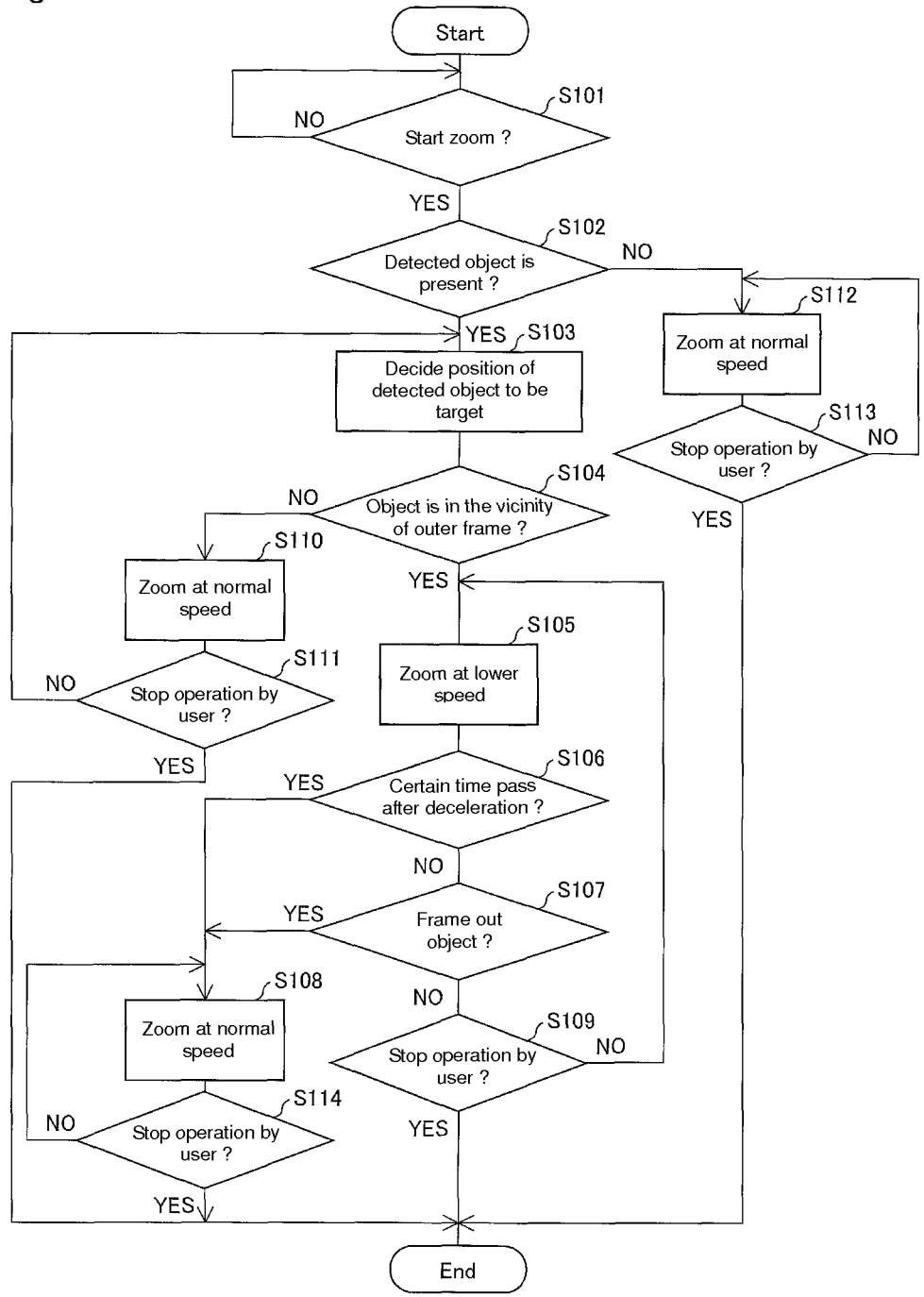
FIG. 6 is a flowchart showing an example of a flow of zoom processing in an imaging apparatus according to an example 1.

Next, a flow of the zoom processing of the imaging apparatus 1 according to the present example will be described with reference to FIG. 6. FIG. 6 is a flowchart illustrating the flow of the zoom processing of the imaging apparatus 1 according to the example 1.

As shown in FIG. 6, first of all, it is decided whether the zoom operation is started in the imaging apparatus 1 or not (S101). In other words, the zoom operation accepting unit 23 decides presence of the zoom operation. If the zoom operation is not started (NO in S101), the zoom operation accepting unit 23 waits for the zoom operation to be started.

Next, if the zoom operation is started (YES in S101), the object position deciding unit 24 executes object detection processing over image data and decides whether a detected object is present or not as a result (S102). If the detected object is not present (NO in S102), the zoom processing is carried out at the normal zoom speed (S112). The zoom processing is repetitively carried out at the normal zoom speed in S112 as long as a user does not stop the operation (if NO in S113). If the zoom reaches a limit of a range in which the zoom can be performed, moreover, the processing is ended. The following is the same.

If the detected object is present in the image data (YES in S102), the object position deciding unit 24 decides a position of a detected object to be a target (S103). If the object position deciding unit 24 decides that the position of the detected object in the display screen is not placed in the vicinity of the outer frame (NO in S104), then, the imaging apparatus 1 executes the zoom processing at the normal zoom speed (S110). As long as the user does not stop the operation (if NO in S111), the zoom processing is repetitively carried out at the normal zoom speed in S110 until it is decided that the position of the detected object is placed in the vicinity of the outer frame.

If the position of the object is placed in the vicinity of the outer frame (YES in S104), the imaging apparatus 1 executes the zoom processing at a lower speed (S105). Specifically, the zoom amount control unit 25 sets the zoom speed into a lower zoom speed and the display control unit 22 executes the zoom processing based on the set lower zoom speed to generate screen data.

Furthermore, the zoom amount control unit 25 decides whether a predetermined time passes after deceleration or not (S106). If the predetermined time does not pass after the deceleration (NO in S106), moreover, the object position deciding unit 24 decides whether the detected object is framed out to the outside of the display area by a predetermined amount or not (S107).

If the predetermined time passes after the deceleration (YES in S106) or the detected object is framed out to the outside of the display area by a predetermined amount (YES in S107), the imaging apparatus 1 executes the zoom processing at the normal speed (S108). Specifically, the zoom amount control unit 25 sets the zoom speed into the normal zoom speed and the display control unit 22 executes the zoom processing based on the set normal zoom speed to generate screen data. As long as the user does not stop the operation (if NO in S114), the zoom processing is repetitively carried out at the normal zoom speed in S108.

If the detected object is not framed out to the outside of the display area by a predetermined amount (NO in S107), the zoom operation accepting unit 23 decides whether the user stops the zoom operation or not (S109). If the user stops the zoom operation (YES in S109), the processing is ended. On the other hand, if the user does not stop the zoom operation (NO in S109), the processing returns to S105 in which the zoom processing at the lower speed is continuously carried out.

Example 2

Figure 7:
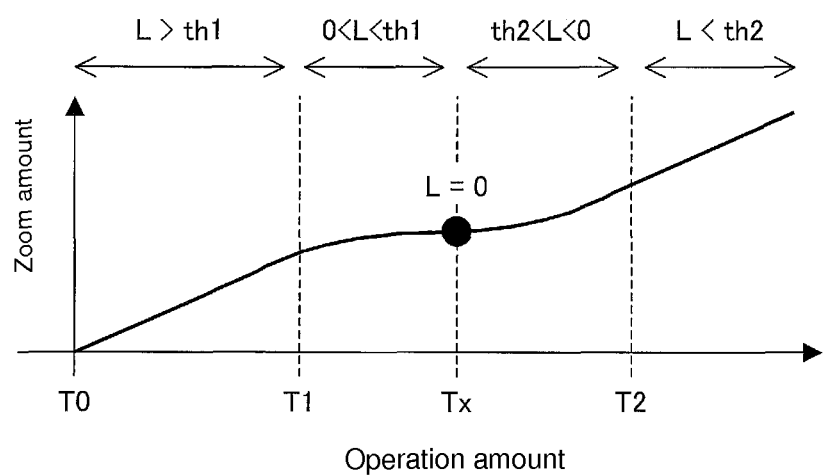
FIG. 7 is a graph showing an example of the relationship of the zoom amount with the operation amount.

Next, another example of the zoom processing of the imaging apparatus 1 will be described with reference to FIGS. 7 and 8. In the present example, description will be given to gradual decrease in the zoom speed.

In the present example, in the case in which the detected object area approaches a place separated from the outer frame of the display area D by a predetermined distance or less during the zoom operation, the zoom speed is gradually decreased. In the case in which the detected object area is framed out from the outer frame of the display area D by a predetermined distance or more during a further zoom operation, moreover, the zoom speed is gradually increased. In the case in which a predetermined time passes during the further zoom operation, the zoom speed may be gradually increased.

More specific description will be given as follows. In the following, the positional relationship between the detected object area R2 of the landmark M2 and the outer frame of the display area D will be described with reference to FIGS. 3 and 5.

When the zoom operation is started, the upper side of the detected object area R2 and the upper side of the outer frame of the display area D approach each other by the zoom processing with increase in the operation amount. In other words, L shown in FIG. 3 is decreased with the increase in the operation amount. If L>th1 is set, the object position deciding unit 24 decides that a position in the display area of the detected object area R2 of the landmark M2 is not placed in the vicinity of the outer frame. Correspondingly, the zoom amount control unit 25 sets the zoom speed as a normal zoom speed. Accordingly, the zoom processing is carried out at the normal zoom speed in a section with an operation amount of T0 to T1 as shown in FIG. 7.

When the zoom operation is continuously carried out so that the operation amount reaches T1, furthermore, L=th1 is obtained as shown in FIG. 5A. When the zoom operation is continuously carried out so that the operation amount reaches Tx, moreover, L=0 is obtained as shown in FIG. 5B. At this time, the upper side of the detected object area R2 and the upper side of the outer frame of the display area D overlap with each other. With 0≤L<th1 (i.e., in a section of the operation amount of T1 to Tx), the object position deciding unit 24 decides that the position in the display area of the detected object area R2 of the landmark M2 is placed in the vicinity of the outer frame. In this section, the zoom amount control unit 25 gradually decreases the zoom speed from the normal zoom speed to the lower zoom speed.

From the state in which the upper side of the detected object area R2 and the upper side of the outer frame of the display area D overlap with each other as shown in FIG. 5B to a state in which the zoom operation is further carried out continuously so that L becomes smaller than the threshold th2 (that is, th2<L≤0; a section with an operation amount of Tx to T2), the object position deciding unit 24 decides that the position at the outside of the display area of the detected object area R2 of the landmark M2 is placed in the vicinity of the outer frame. In this section, the zoom amount control unit 25 gradually increases the zoom speed to reach the normal zoom speed.

When the operation amount is larger than T2 so that L<th2 (<0) is obtained as shown in FIG. 5C, furthermore, the object position deciding unit 24 decides that the position of the detected object area R2 of the landmark M2 is framed out to the position which is not placed in the vicinity of the outer frame at the outside of the display area. Correspondingly, the zoom amount control unit 25 maintains the zoom speed to be the normal zoom speed.

In the case in which a certain time passes since the start of the deceleration, the zoom amount control unit 25 may start the acceleration before L 0 is obtained.

(Flow of Zoom Processing)

Next, a flow of the zoom processing of the imaging apparatus 1 according to the present example will be described with reference to FIG. 8. FIG. 8 is a flowchart illustrating the flow of the zoom processing of the imaging apparatus 1 according to the example 2.

Figure 8:
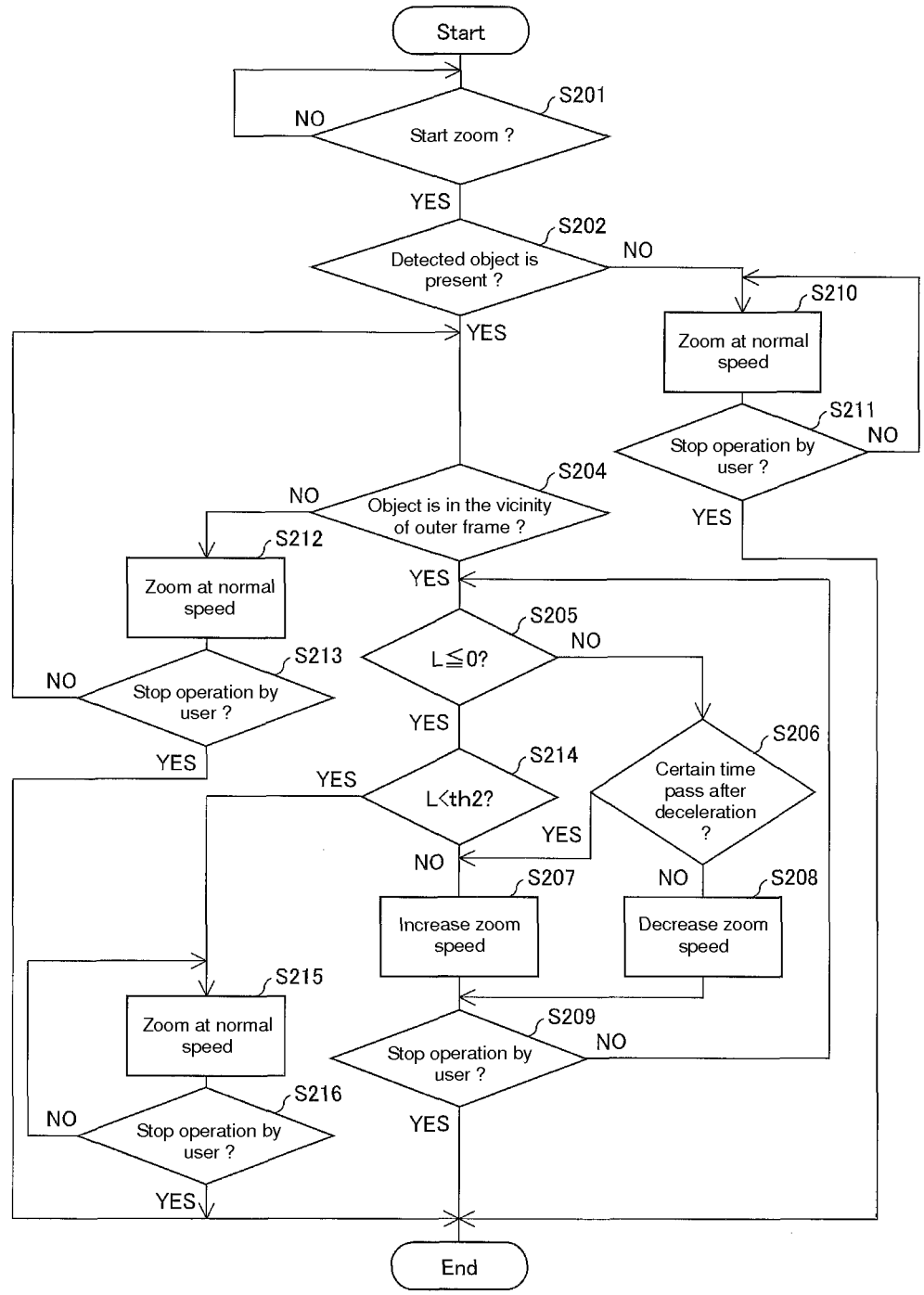
FIG. 8 is a flowchart illustrating a flow of zoom processing in an imaging apparatus according to an example 2.

Since S201, S202, S210 and S211 shown in FIG. 8 are the same as S101, S102, S112 and S113 shown in FIG. 6, respectively, description thereof will be omitted.

If YES in S202, the object position deciding unit 24 decides whether a position of a detected object to be a target is placed in the vicinity of the outer frame or not (S204). If the object position deciding unit 24 decides that the position of the detected object in the display screen is not placed in the vicinity of the outer frame (NO in S204), the imaging apparatus 1 executes the zoom processing at the normal zoom speed (S212). As long as the user does not stop the operation (if NO in S213), the zoom processing is repetitively carried out at the normal zoom speed in S212 until it is decided that the position of the detected object is placed in the vicinity of the outer frame.

If the object is placed in the position in the vicinity of the outer frame (YES in S204), the object position deciding unit 24 further decides whether L 0 is set or not (S205).

If a result of the decision of the object position deciding unit 24 is not L 0 (NO in S205), the zoom amount control unit 25 decides whether a predetermined time passes after the deceleration or not (S206). If the predetermined time passes after the deceleration (YES in S206), the zoom amount control unit 25 gradually increases the zoom speed (S207). The zoom amount control unit 25 may gradually increase the zoom speed to reach the normal zoom speed.

On the other hand, if the predetermined time does not pass after the deceleration (NO in S206), the zoom amount control unit 25 gradually decreases the zoom speed (S208). The zoom amount control unit 25 may gradually decrease the zoom speed to reach the lower zoom speed. Subsequently, the zoom operation accepting unit 23 decides whether the user stops the zoom operation or not (S209).

If the user stops the zoom operation (YES in S209), the processing is ended. On the other hand, if the user does not stop the zoom operation (NO in S209), the processing returns to S205 and the zoom processing is continuously carried out.

If the processing of S205 to S209 is repetitively carried out so that the result of the decision in the object position deciding unit 24 is obtained as L≤0 (YES in S205), moreover, the object position deciding unit 24 decides whether L<th2 is set or not (S214).

If L<th2 is not set (NO in S214), S207 is executed. Since S207 has been described above, explanation thereof will be omitted.

On the other hand, if L<th2 is set (YES in S214), the zoom processing is executed based on the normal zoom speed in the imaging apparatus 1 (S215). As long as the user does not stop the operation (if NO in S216), the zoom processing is repetitively carried out at the normal zoom speed in S215.

Example 3

Figure 9:
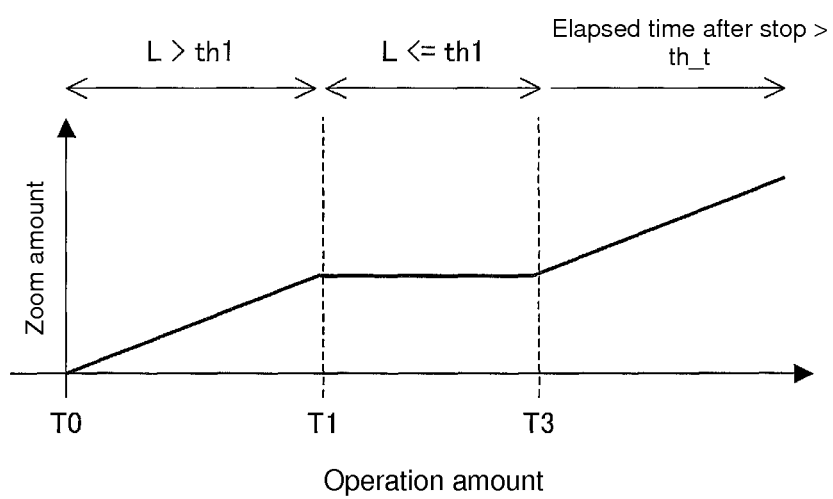
FIG. 9 is a graph showing an example of a relationship of a zoom amount with an operation amount.

Next, yet another example of the zoom processing of the imaging apparatus 1 will be described with reference to FIGS. 9 and 10. In the present example, description will be given to stop of zoom.

In the present example, in the case in which the detected object area approaches a place separated from the outer frame of the display area D by a predetermined distance or less during the zoom operation, the zoom is stopped (i.e. the zoom speed is set to be zero). In the case in which a further zoom operation is carried out so that a predetermined time passes during the stop of the zoom, moreover, the zoom speed is returned to an original speed.

More specific description will be given as follows. In the following, the positional relationship between the detected object area R2 of the landmark M2 and the outer frame of the display area D will be described with reference to FIGS. 3 and 5.

When the zoom operation is started, the upper side of the detected object area R2 and the upper side of the outer frame of the display area D approach each other by the zoom processing with increase in the operation amount. In other words, L shown in FIG. 3 is decreased with the increase in the operation amount. If L>th1 is set, the object position deciding unit 24 decides that a position in the display area of the detected object area R2 of the landmark M2 is not placed in the vicinity of the outer frame. Correspondingly, the zoom amount control unit 25 sets the zoom speed as a normal zoom speed. Accordingly, the zoom processing is carried out at the normal zoom speed in a section with an operation amount of T0 to T1 as shown in FIG. 9.

When the zoom operation is continuously carried out so that the operation amount reaches T1, furthermore, L=th1 is obtained as shown in FIG. 5A.

When the zoom operation is continuously carried out so that L≤th1 is obtained, furthermore, the object position deciding unit 24 decides that the position in the display area of the detected object area R2 of the landmark M2 is placed in the vicinity of the outer frame. Correspondingly, the zoom amount control unit 25 sets the zoom speed into "0". Consequently, the zoom processing is stopped.

In the case in which the zoom operation is continuously carried out, moreover, the zoom amount control unit 25 decides whether a predetermined time th_t passes since the stop of the zoom processing or not.

If the predetermined time th_t does not pass since the stop of the zoom processing (that is, a stop time≤th_t), the zoom amount control unit 25 maintains the zoom speed to be "0". Accordingly, the zoom processing is stopped in the operation amount of T1 to T3 until the predetermined time th_t passes since the stop of the zoom processing.

On the other hand, if the predetermined time th_t passes since the stop of the zoom processing (that is, the stop time>th_t), the zoom amount control unit 25 returns the zoom speed into the normal zoom speed. Accordingly, the zoom processing is carried out at the normal zoom speed after the operation amount T3 since passage of the predetermined time th_t from the stop of the zoom processing.

(Flow of Zoom Processing)

Next, a flow of the zoom processing of the imaging apparatus 1 according to the present example will be described with reference to FIG. 10. FIG. 10 is a flowchart illustrating the flow of the zoom processing of the imaging apparatus 1 according to the example 3.

Figure 10:
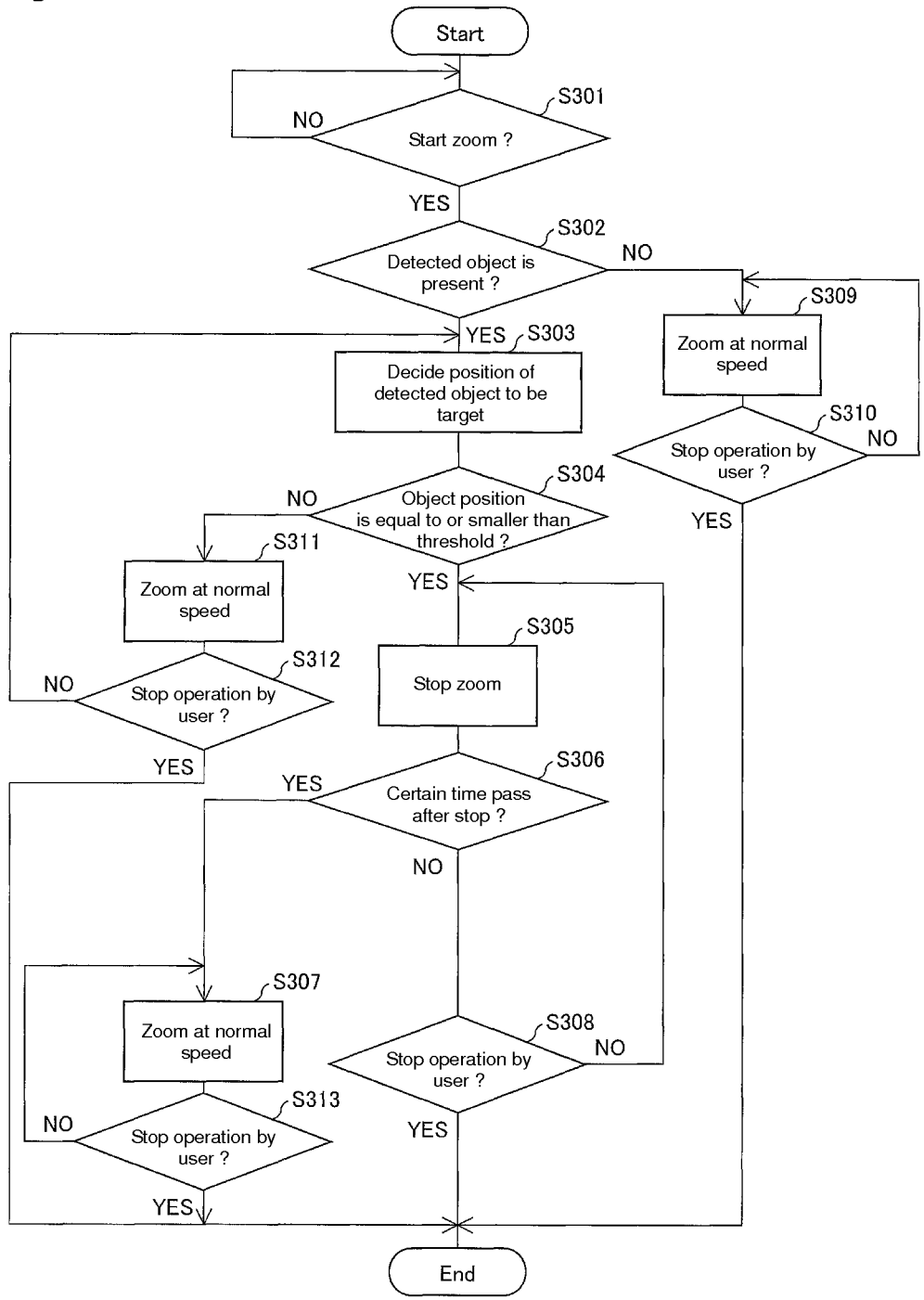
FIG. 10 is a flowchart illustrating a flow of zoom processing in an imaging apparatus according to an example 3.

Since S301, S302, S309 and S310 shown in FIG. 10 are the same as S101, S102, S112 and S113 shown in FIG. 6, respectively, description thereof will be omitted.

In S303, the object position deciding unit 24 decides a position of a detected object to be a target. Specifically, the object position deciding unit 24 decides whether or not the position of the detected object area from the outer frame of the display area has a threshold or less. In other words, the object position deciding unit 24 decides whether the position of the detected object in the display screen is placed in the vicinity of the outer frame or not.

If the position of the detected object area from the outer frame of the display area does not have the threshold or less (NO in S304), the imaging apparatus 1 executes the zoom processing at the normal zoom speed (S311). As long as the user does not stop the operation (if NO in S312), the zoom processing is repetitively carried out at the normal zoom speed in S311 until it is decided that the position of the detected object area has the threshold or less. Since S311 is the same as S110, description thereof will be omitted.

On the other hand, if the position of the detected object area from the outer frame of the display area has the threshold or less (YES in S304), the zoom amount control unit 25 sets the zoom speed to "0". Consequently, the zoom processing is stopped (S305).

Next, the zoom amount control unit 25 decides whether a predetermined time passes after the deceleration or not (S306). If the predetermined time passes after the deceleration (YES in S306), the zoom amount control unit 25 sets the zoom speed as the normal zoom speed (S307). As long as the user does not stop the operation (if NO in S313), the zoom processing is repetitively carried out at the normal zoom speed in S307.

On the other hand, if the predetermined time does not pass after the deceleration (NO in S306), the zoom operation accepting unit 23 decides whether the user stops the zoom operation or not (S308).

If the user stops the zoom operation (YES in S308), the processing is ended. On the other hand, if the user does not stop the zoom operation (NO in S308), the processing returns to S305. Consequently, the zoom processing is maintained in a stopping state even if the zoom operation is carried out in the imaging apparatus 1.

Example 4

Next, a further example of the zoom processing of the imaging apparatus 1 will be described with reference to FIGS. 11 and 12. In the present example, description will be given to that the zoom speed is gradually decreased to carry out the stop.

In the present example, in the case in which the detected object area approaches a place separated from the outer frame of the display area D by a predetermined distance or less during the zoom operation, the zoom speed is gradually decreased. According to one or more embodiments of the present invention, when the detected object area further approaches the vicinity of the outer frame of the display area D by an additional zoom operation, moreover, the zoom speed is set to "0" and the zoom processing is thus stopped. Referring to a deceleration rate of the zoom speed, regulate the zoom speed into "0" when the detected object area further approaches the vicinity of the outer frame of the display area D.

In the case in which a further zoom operation is carried out so that a predetermined time passes during the stop of the zoom, moreover, the zoom speed is gradually increased. In a further zoom operation, the zoom speed is returned to an original speed before a predetermined time passes or the detected object area is framed out from the outer frame of the display area D by a predetermined distance or more. Referring to an acceleration rate of the zoom speed, one or more embodiments of the present invention regulates the zoom speed into the original speed before a predetermined time passes or the detected object area is framed out from the outer frame of the display area D by a predetermined distance or more.

More specific description will be given as follows. In the following, the positional relationship between the detected object area R2 of the landmark M2 and the outer frame of the display area D will be described with reference to FIGS. 3 and 5.

When the zoom operation is started, the upper side of the detected object area R2 and the upper side of the outer frame of the display area D approach each other by the zoom processing with increase in the operation amount. In other words, L shown in FIG. 3 is decreased with the increase in the operation amount. If L>th1 is set, the object position deciding unit 24 decides that a position in the display area of the detected object area R2 of the landmark M2 is not placed in the vicinity of the outer frame. Correspondingly, the zoom amount control unit 25 sets the zoom speed as a normal zoom speed. Accordingly, the zoom processing is carried out at the normal zoom speed in a section with an operation amount of T10 to T11 as shown in FIG. 11.

When the zoom operation is continuously carried out so that the operation amount reaches T11, furthermore, L=th1 is obtained as shown in FIG. 5A.

Moreover, the zoom amount control unit 25 gradually decreases the zoom speed until the zoom operation is continuously carried out so that L=th1' is obtained with respect to another smaller threshold th1' than the threshold th1 (th1'<th1; th1'≥0 may be set). In other words, the zoom amount control unit 25 gradually decreases the zoom speed if th1'<L≤th1 is set.

Figure 11:
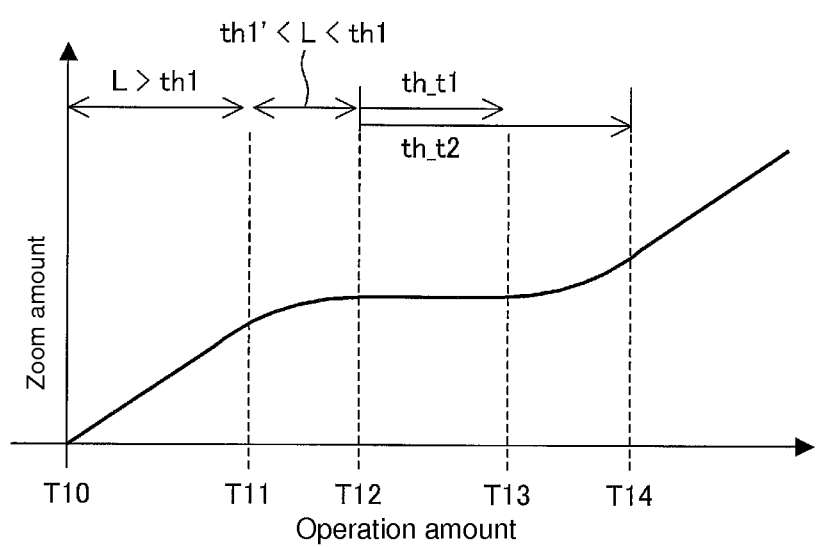
FIG. 11 is a graph showing an example of the relationship of the zoom amount with the operation amount.

In a section with an operation amount of T11 to T12 shown in FIG. 11, accordingly, the zoom speed is gradually decreased so that the zoom processing is carried out.

When the operation amount reaches T12, L=th1' is obtained.

When the operation amount is equal to or larger than T12 so that L<th1' is obtained, furthermore, the zoom amount control unit 25 sets the zoom speed to zero in this section. Consequently, the zoom processing is stopped.

The zoom amount control unit 25 maintains the zoom speed to be zero until a predetermined time th_t1 passes since the stop of the zoom processing. Therefore, the zoom processing is stopped in an operation amount of T12 to T13.

When the predetermined time th_t1 passes since the stop of the zoom processing, the zoom amount control unit 25 gradually increases the zoom speed. The zoom amount control unit 25 returns the zoom speed into the original normal zoom speed before the position of the detected object area R2 of the landmark M2 is separated from the frame of the display area by a predetermined distance (th2) or more or a predetermined time th_t2 passes since the stop of the zoom processing.

Accordingly, the zoom speed is gradually increased in an operation amount of T13 to T14. When the operation amount T14 is exceeded, the zoom speed is returned into the normal zoom speed.

(Flow of Zoom Processing)

Next, a flow of the zoom processing of the imaging apparatus 1 according to the present example will be described with reference to FIG. 12. FIG. 12 is a flowchart illustrating the flow of the zoom processing of the imaging apparatus 1 according to the example 4.

Figure 12:
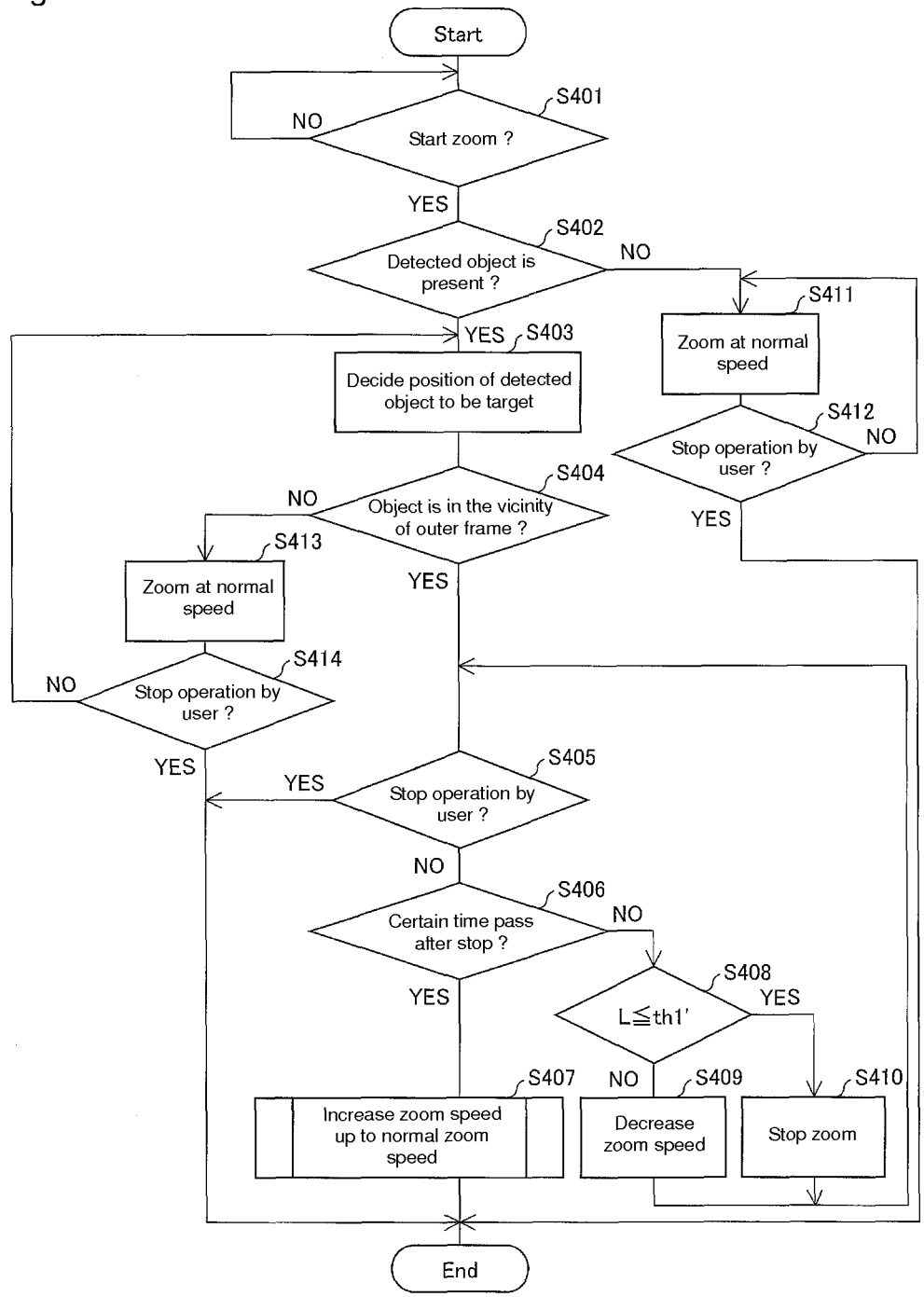
FIG. 12 is a flowchart illustrating a flow of zoom processing in an imaging apparatus according to an example 4.

Since S401 to S404, S411, S412, S413 and S414 shown in FIG. 12 are the same as S101 to S104, S112, S113, S110 and S111 shown in FIG. 6, respectively, description thereof will be omitted.

If an object is placed in a position in the vicinity of the outer frame (YES in S404), the zoom operation accepting unit 23 decides whether the user stops the zoom operation or not (S405).

If the user stops the zoom operation (YES in S405), the processing is ended. On the other hand, if the user does not stop the zoom operation (NO in S405), the zoom amount control unit 25 decides whether a predetermined time passes since the stop of the zoom or not (S406).

If the predetermined time does not pass since the stop of the zoom (NO in S406), the object position deciding unit 24 decides whether L≤th1' is set or not (S408).

When L>th1' is set (NO in S408), the zoom amount control unit 25 gradually decreases the zoom speed (S409) and the processing is returned to S405.

On the other hand, when L≤th1' is set (YES in S408), the zoom amount control unit 25 sets the zoom speed to zero (that is, stops the zoom) (S410) and the processing is returned to S405.

If a predetermined time passes since the stop of the zoom (YES in S406), then, the zoom amount control unit 25 gradually increases the zoom speed (S407). Specifically, the zoom amount control unit 25 gradually increases the zoom speed to return the zoom speed into the original normal zoom speed before the position of the detected object area R2 of the landmark M2 is separated from the frame of the display area by a predetermined distance (th2) or more or a predetermined time (th_t2) passes. Consequently, the processing is ended.

(Variant)

Although the zoom processing in the photographing mode has been described above, the present invention is not restricted thereto. The zoom processing described above can also be applied to the image browsing function in the image browsing mode. In other words, the zoom processing can also be applied to the imaging apparatus 1 serving as an image display apparatus having the image browsing function.

(Function and Effect)

The imaging apparatus 1 according to the first embodiment serves to zoom display an image to be displayed on the display area D of the display unit 50 and includes the object position deciding unit 24 configured to specify a position of an object contained in the displayed image and to decide the positional relationship between the outer frame of the display area D of the display unit 50 and the position of the object, and the zoom amount control unit 25 configured to change a zoom amount in the zoom display depending on the decided positional relationship.

Therefore, it is possible to produce an effect that proper zoom processing corresponding to the position of the object can be carried out.

Second Embodiment

Next, a second embodiment of the present invention will be described with reference to FIGS. 13 to 15. For convenience of explanation, members having similar functions as those described in the first embodiment have the same reference numerals and explanation thereof will be omitted. Stepwise zoom processing will be described below.

First of all, an image display apparatus 2 according to a second embodiment of the present invention will be described with reference to FIG. 13. Specifically, the image display apparatus 2 can be implemented by an information terminal having an image browsing function (a notebook type PC, a tablet type PC or a smart phone). Moreover, the image browsing mode of the imaging apparatus 1 may be implemented by the image display apparatus 2 which will be described below. Image display in the image browsing function may take a format of full screen display or a format of window display. The format of the window display will be illustratively described below.

Figure 13:
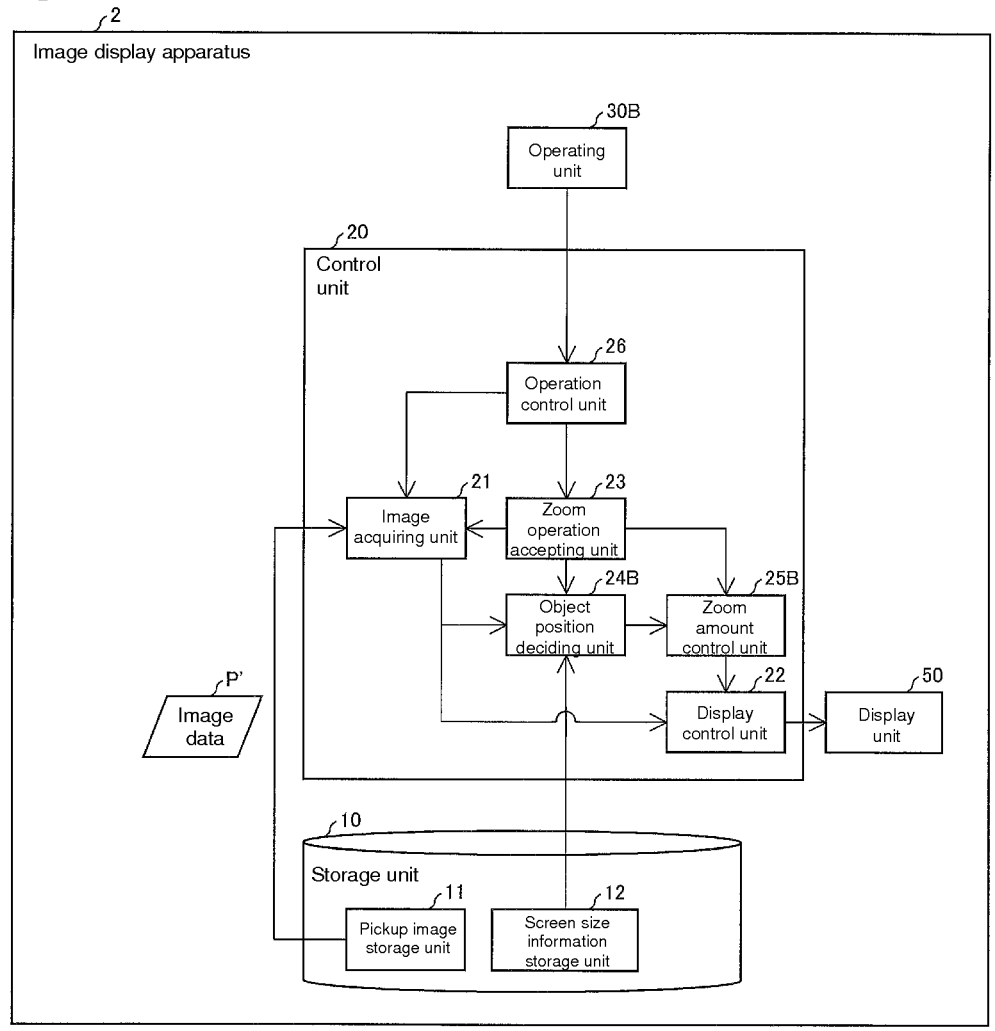
FIG. 13 is a functional block diagram showing a schematic structure of an image display apparatus according to a second embodiment of the present invention.
Figure 14:
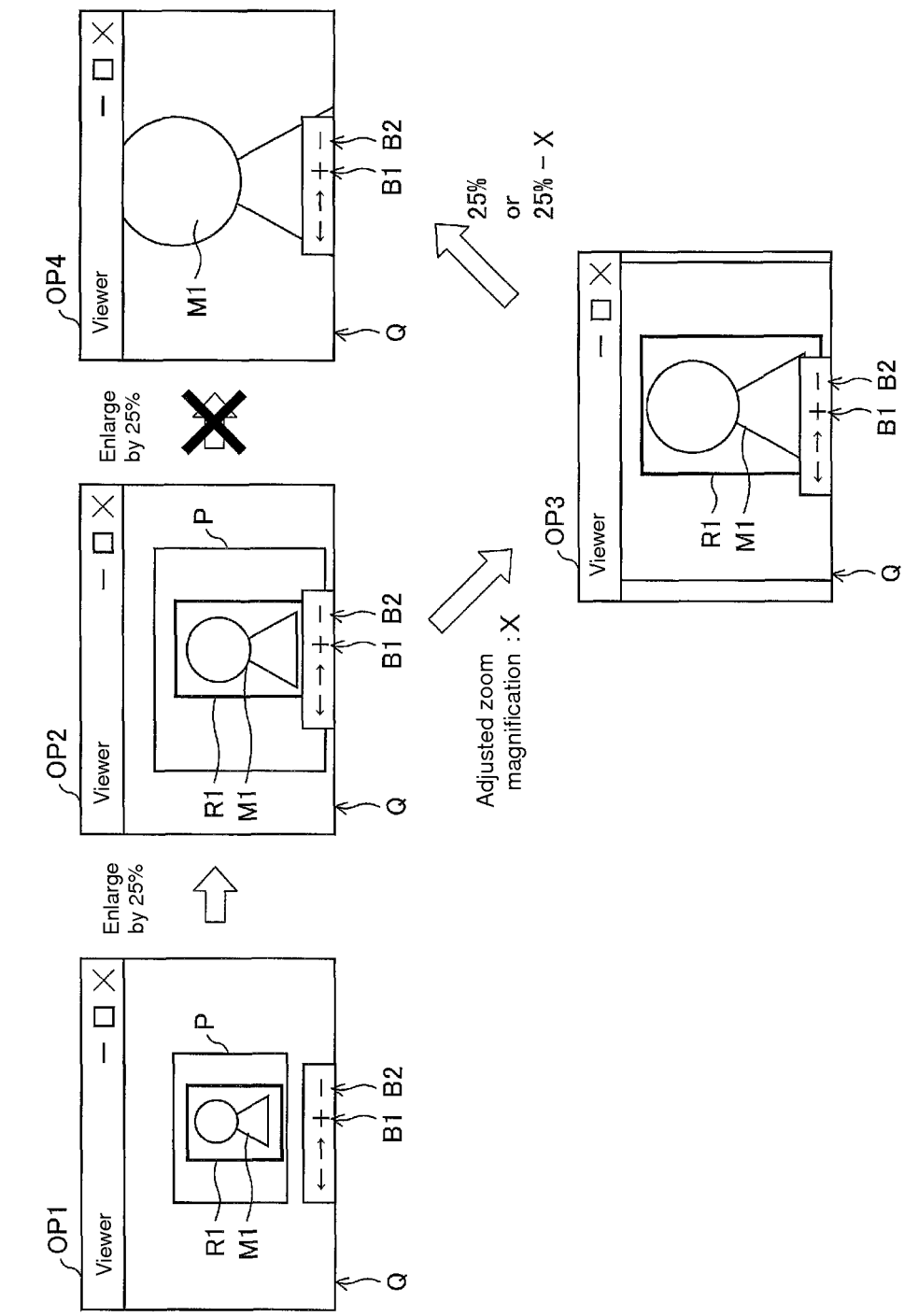
FIG. 14 is a view for explaining a summary of stepwise zoom in the image display apparatus.

As shown in FIG. 13, the image display apparatus 2 includes a storage unit 10, a control unit 20B, an operating unit 30B and a display unit 50B.

The image display apparatus 2 is obtained by replacing the control unit 20 and the operating unit 30 with the control unit 20B and the operating unit 30B, respectively and removing the imaging unit 40 in the imaging apparatus 1 according to the first embodiment.

Description will be given to the control unit 20B, the operating unit 30B and the display unit 50B which have not been explained above.

The control unit 20B is obtained by replacing the object position deciding unit 24 and the zoom amount control unit 25 with an object position deciding unit 24B and a zoom amount control unit 25B, respectively and adding an operation control unit 26 in the control unit 20 of the imaging apparatus 1. Referring to the control unit 20B, since the other members are the same as those in the control unit 20, description thereof will be omitted. The details of the operation control unit 26, the object position deciding unit 24B and the zoom amount control unit 25B will be described later.

The operating unit 30B serves to accept various inputs from a user and can be implemented by a pointing device such as an inputting button, a keyboard, a ten-key pad or a mouse, a touch panel or the other input devices. The operating unit 30B generates operation data in response to the user's operation which is accepted and transmits the generated operation data to the control unit 20B.

It is assumed that screen size information stored in a screen size information storage unit 12 of the storage unit 10 indicates a size of a display area Q in a window. Moreover, a window configured to display image data is displayed wholly or partially in a display area D of the display unit 50B.

(Structure of Control Unit)

The details of the operation control unit 26, the object position deciding unit 24B and the zoom amount control unit 25B provided in the control unit 20B will be described below.

The operation control unit 26 detects an input operation based on operation data transmitted from the operating unit 30B. Moreover, the operation control unit 26 executes control corresponding to the operation detected in the operating unit 30B. The operation control unit 26 can detect the operation depending on a position pointed through a key pressed down in a keyboard, a mouse or a touch panel or a type of a GUI component, for example.

When detecting the input of an image reading operation, the operation control unit 26 gives an image acquiring unit 21 an instruction to acquire an image. The image reading operation serves to cause a user to designate image data to be an image browsing target by a keyboard or a mouse, for example.

When detecting the input of a zoom operation, moreover, the operation control unit 26 gives a zoom operation accepting unit 23 an instruction to accept zoom processing. The zoom operation serves to cause a user to press down a zoom button displayed on a screen through a mouse or the like, for example.

The object position deciding unit 24B serves to detect an object from image data when the zoom processing is accepted and to decide whether an object subjected to the zoom processing stays in the display area Q or protrudes from the display area Q based on the screen size information stored in the screen size information storage unit 12.

The zoom amount control unit 25B determines a zoom magnification (or a zoom amount or a zoom speed) based on a result of decision of a position of the object in the display area Q. The zoom amount control unit 25B supplies the determined zoom magnification to a display control unit 22.

The zoom magnification determined by the zoom amount control unit 25B includes a preset normal zoom magnification and an adjusted zoom magnification which is obtained by adjusting the normal zoom magnification.

The adjusted zoom magnification is obtained in the following manner. For example, in the case in which the zoom processing is carried out at the normal zoom magnification so that a detected object protrudes from the display area, the zoom magnification is adjusted in such a manner that the detected object does not protrude from the display area.

(Summary of Stepwise Zoom Processing)

Next, summary of stepwise zoom in the image display apparatus 2 will be described with reference to FIG. 14. In the image display apparatus 2, the zoom processing is carried out at the zoom magnification determined by the zoom amount control unit 25B every time the zoom operation is detected as will be described below.

A state OP1 represents an initial condition brought before the execution of the zoom processing. Read image data P is displayed on the display area Q of the window. The image data P includes a person M1. The person M1 is detected by object detection in the object position deciding unit 24B and a detected object area R1 indicting that the detected object is present is set to the person M1.

Moreover, a zoom-in button B1 and a zoom-out button B2 are displayed in overlap on the display area Q. Arrangement of the zoom-in button B1 and the zoom-out button B2 shown in FIG. 14 is illustrative and they can be disposed in an optional position of the display area D of the display unit 50B in addition to the display area Q.

When the zoom-in button B1 is once pressed down in the state OP1, the zoom processing is executed so that the image data P is enlarged by 25%. Consequently, a transition to a state OP2 is made.

If the image data P is enlarged by 25% in the zoom processing when the zoom-in button B1 is pressed down once more in the state OP2, an upper part of the person M1 protrudes from the display area Q as shown in a state OP4.

In the case in which the zoom-in button B1 is once pressed down in the state OP2, the image display apparatus 2 calculates such a zoom magnification X that the detected object does not protrude from the display area in order to prevent the upper part of the person M1 from protruding out of the display area Q. When the zoom processing is carried out based on the zoom magnification X calculated by the image display apparatus 2, a condition shown in a state OP3 is brought.

In the state OP3, an upper side of the detected object area R1 of the person M1 is close to an upper side of the display area Q through the zoom processing based on the zoom magnification X.

In the case in which the zoom-in button B1 is pressed down once more in the state OP3, the image display apparatus 2 may carry out the zoom processing at a zoom magnification of 25% or (25−X) %. In the case in which the image display apparatus 2 executes the zoom processing at a zoom magnification of (25−X) %, a transition to the state OP4 is made.

(Flow of Zoom Processing)

Next, a flow of the zoom processing of the image display apparatus 2 according to the second embodiment will be described with reference to FIG. 15. FIG. 15 is a flowchart illustrating the flow of the zoom processing of the image display apparatus 2 according to the second embodiment.

Figure 15:
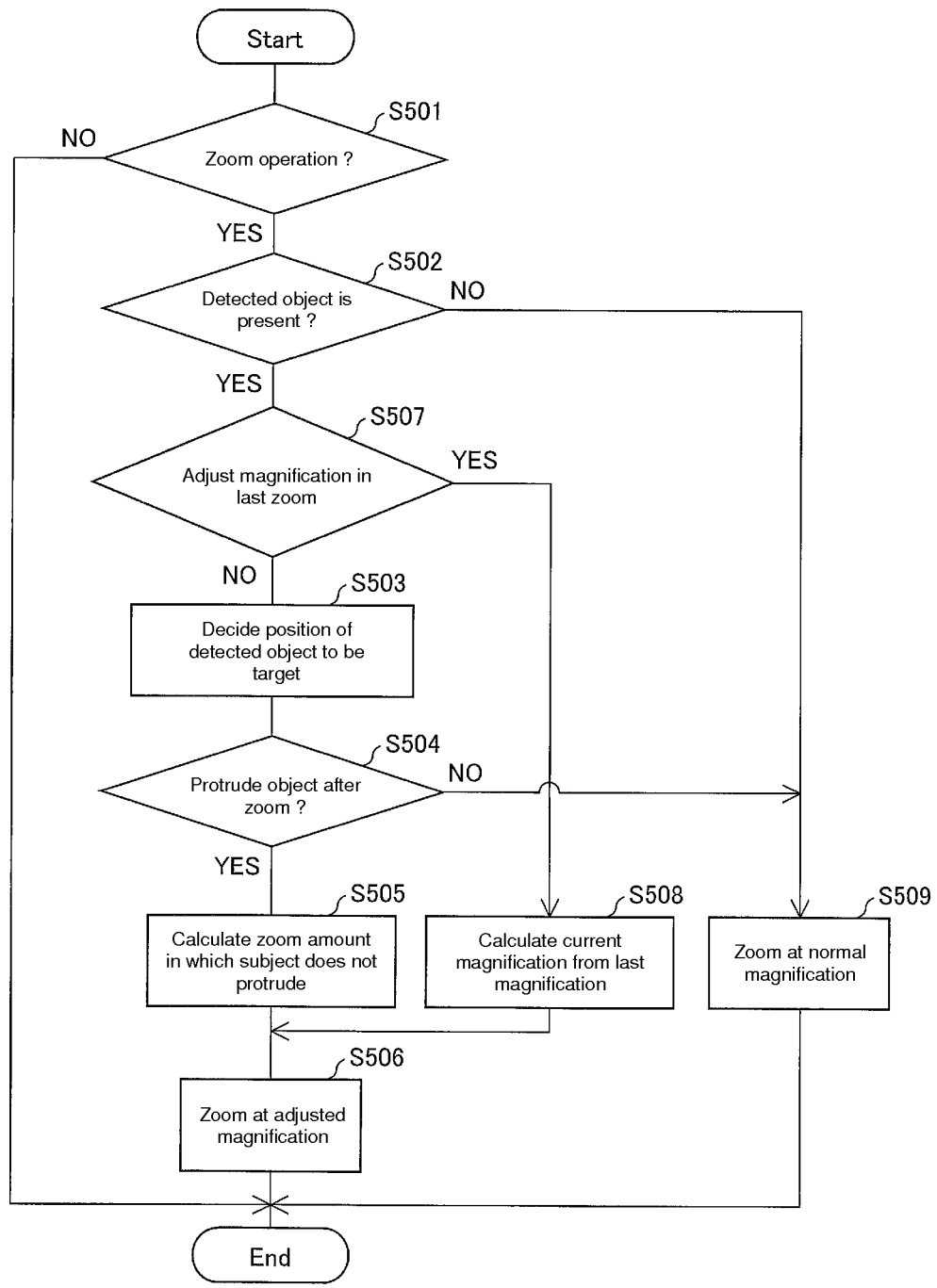
FIG. 15 is a flowchart illustrating a flow of zoom processing in the image display apparatus.

As shown in FIG. 15, first of all, it is decided whether a zoom operation is accepted in the image display apparatus 2 or not (S501). In other words, the zoom operation accepting unit 23 decides whether the zoom operation is detected in the operation control unit 26 or not.

If the zoom operation is not carried out (NO in S501), the processing is ended. On the other hand, if the zoom operation is carried out (YES in S501), the object position deciding unit 24B carries out object detection processing over image data to decide whether a detected object is present or not (S502).

If the detected object is not present (NO in S502), the zoom amount control unit 25B sets a normal zoom magnification. Consequently, the image display apparatus 2 carries out the zoom processing at the normal zoom magnification (S509).

If the detected object is present (YES in S502), the zoom amount control unit 25B decides whether the zoom magnification is adjusted in last zoom processing or not (S507).

If the zoom magnification is adjusted in the last zoom processing (YES in S507), the zoom amount control unit 25B calculates the adjusted zoom magnification in the current zoom processing from a last zoom magnification (S508). Then, the zoom processing is carried out based on the adjusted zoom magnification which is calculated (S506). In S508, for example, the zoom amount control unit 25B calculates 25%−X when the normal zoom magnification is 25% and the last zoom magnification is X.

If the zoom magnification is not adjusted in the last zoom processing (NO in S507), the object position deciding unit 24B decides whether a detected object to be a target protrudes from an inner part of the display area Q after the zoom processing or not (S503).

If the detected object to be the target protrudes from the display area Q after the zoom processing (YES in S504), the zoom amount control unit 25B calculates such a zoom amount that the detected object does not protrude from the display area Q after the zoom processing and calculates an adjusted zoom magnification based on the calculated zoom amount (S505). Thereafter, the zoom processing is carried out based on the adjusted zoom magnification which is calculated (S506).

On the other hand, if the detected object to be the target does not protrude from the display area Q after the zoom processing (NO in S504), the zoom amount control unit 25B sets the zoom magnification as the normal zoom magnification. Then, the zoom processing is carried out based on the normal zoom magnification (S509).

(Function and Effect)

The image display apparatus 2 according to the second embodiment serves to zoom display an image to be displayed on the display area Q of the display unit 50 and includes the object position deciding unit 24B configured to specify a position of an object contained in the displayed image and to decide the positional relationship between the outer frame of the display area Q of the display unit 50 and the position of the object, and the zoom amount control unit 25B configured to change a zoom amount in the zoom display depending on the decided positional relationship.

Third Embodiment

Figure 16:
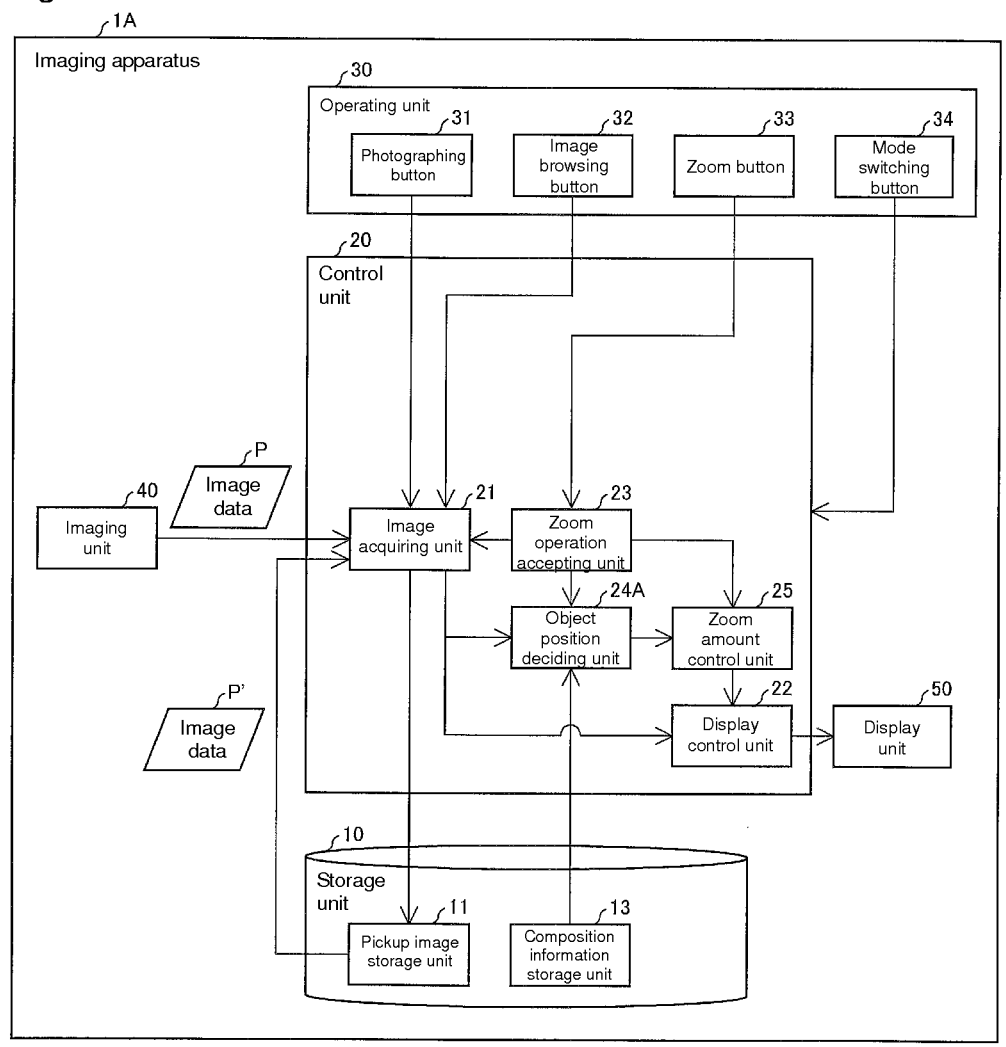
FIG. 16 is a functional block diagram showing a schematic structure of an imaging apparatus according to a third embodiment of the present invention.
Figure 17:
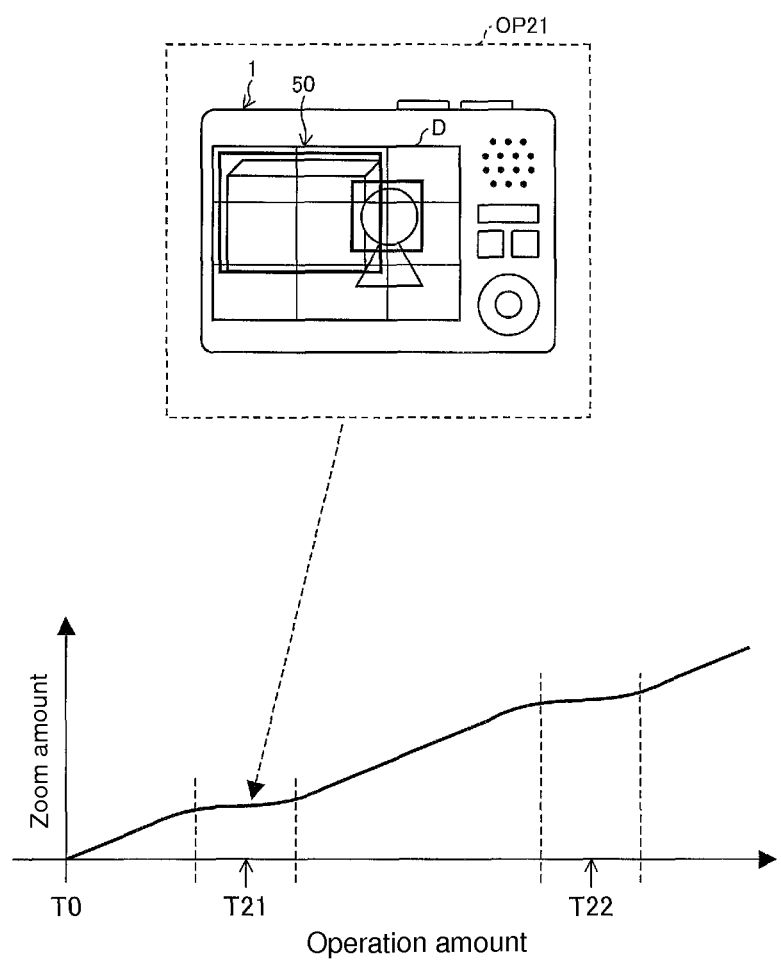
FIG. 17 is a graph showing a relationship of a zoom amount with an operation amount and a view showing display of a display unit on each point of the graph.

A third embodiment of the present invention will be described with reference to FIGS. 16 to 18. For convenience of explanation, members having similar functions as those described in the first and second embodiments have the same reference numerals and explanation thereof will be omitted. Description will be given to control of zoom processing corresponding to a composition in a display area.

First of all, an imaging apparatus 1A according to a third embodiment of the present invention will be described with reference to FIG. 16. The imaging apparatus 1A is obtained by replacing the screen size information storage unit 12 and the object position deciding unit 24 with a composition information storage unit 13 and an object position deciding unit 24A, respectively in the imaging apparatus 1 according to the first embodiment. Since the other members of the imaging apparatus 1A are the same as those of the imaging apparatus 1, description thereof will be omitted.

The composition information storage unit 13 stores composition information which defines a composition in a display area D of a display unit 50. The composition information may indicate a composition for dividing a display area at a predetermined ratio. The composition information is related to an area obtained by dividing the display area D through a three-division method, for example.

The three-division method represents a technique for dividing a screen into nine equal parts and arranging important elements in a composition on their lines or intersection points of the lines, thereby keeping a balance.

The three-division method will be specifically described as follows with reference to FIG. 18. FIG. 18 shows an example in which the display area D is divided by the three-division method.

Figure 18:
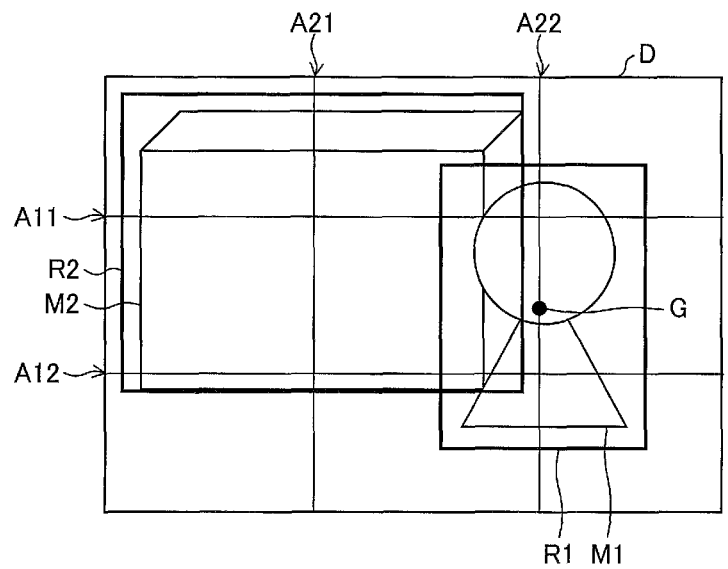
FIG. 18 is a view for explaining zoom processing applying a three-division method.

As shown in FIG. 18, the display area D is divided equally into nine areas by dividing lines A11 and A12 in a horizontal direction and dividing lines A21 and A22 in a vertical direction. The three-division method is a technique for arranging an outer frame of a detected object area or a center of gravity of the detected object on the lines or intersection points of the dividing lines A11, A12, A21 and A22, thereby obtaining a well-balanced composition.

The composition information may be information indicative of positions, dividing lines (boundaries) and sizes of the nine divided areas obtained by dividing the display area D through the three-division method.

The object position deciding unit 24A serves to detect an object from image data when zoom processing is accepted, and to decide a position in a display area of the detected object based on the composition information stored in the composition information storage unit 13. The object position deciding unit 24A may decide whether the position of the detected object is close to the outer frame of any of the divided areas or not. Moreover, the object position deciding unit 24A may decide whether the position of the detected object is close to the dividing lines A11, A12, A21 and A22 or not. The object position deciding unit 24A may set the outer frame of the object detecting area as a reference of the object or may set a center of gravity of the detected object (or the object detecting area) as a reference of the position of the object. Description will be given to the case in which the object position deciding unit 24A illustratively sets the center of gravity of the object detecting area as the reference of the position of the object. For example, a center of gravity G shown in FIG. 18 serves as a center of gravity of the detected object area R1 of a person M1.

Since the technique described above can be employed for the decision of the position (for example, a decision of closeness), explanation thereof will be omitted.

(Referring to Zoom Processing Applying Three-Division Method)

Next, zoom processing applying the three-division method will be described with reference to FIGS. 17 and 18. Description will be given to an example in which the object position deciding unit 24A decides the position of the center of gravity G of the detected object area R1 of the person M1 shown in FIG. 18. Description will be given to the case in which the center of gravity G of the detected object area R1 of the person M1 shown in FIG. 18 is present in an area on a right side of the dividing line A22 (any of the three divided areas) and traverses the dividing lines A22 and A21 from a right side to a left side in this order together with the zoom operation.

The normal zoom speed is set by the zoom amount control unit 25 till a predetermined operation amount in which the zoom processing is started and the center of gravity of the detected object area R1 approaches the dividing line A22.

When the center of gravity of the detected object area R1 approaches the dividing line A22, the zoom amount control unit 25 decreases the zoom speed (a section represented as T21). When the center of gravity G of the detected object area R1 of the person M1 overlaps with the dividing line A22 as shown in FIG. 18, the zoom amount control unit 25 may set the zoom speed to zero for a predetermined period of time.

When the zoom operation is carried out so that the center of gravity G of the detected object area R1 of the person M1 is separated from the dividing line A22 by a predetermined distance, moreover, the zoom amount control unit 25 increases the zoom speed.

When the zoom operation is further carried out so that the center of gravity G of the detected object area R1 of the person M1 approaches the dividing line A21, furthermore, the zoom amount control unit 25 decreases the zoom speed (a section represented as T22).

When the zoom operation is further carried out so that the center of gravity G of the detected object area R1 of the person M1 is separated from the dividing line A21 by a predetermined distance, moreover, the zoom amount control unit 25 increases the zoom speed.

It is possible to employ the increase and decrease in the zoom speed through the zoom amount control unit 25 which has been described above.

(Function and Effect)

The imaging apparatus 1A according to the third embodiment serves to zoom display an image to be displayed on the display area of the display unit 50 and includes the object position deciding unit 24A configured to divide the display area of the display unit 50 into a plurality of divided areas in a predetermined composition, to specify a position of an object contained in the displayed image and to decide a positional relationship between a boundary between the divided areas and the position of the object, and the zoom amount control unit 25 configured to change a zoom amount in the zoom display depending on the decided positional relationship.

Therefore, it is possible to produce an effect that proper zoom processing corresponding to the position of the object can be carried out.

[Implementation by Software]

A control block of the imaging apparatuses 1 and 1A and the image display apparatus 2 may be implemented by a logic circuit (hardware) formed on an integrated circuit (an IC chip) or the like or may be implemented by software using a CPU (Central Processing Unit).

In the latter case, the imaging apparatuses 1 and 1A and the image display apparatus 2 include a CPU configured to execute an instruction of a program which is software for implementing each function, an ROM (Read Only Memory) or a storage device in which the program and various data are recorded readably by a computer (or a CPU) (they are referred to as "recording media"), an RAM (Random Access Memory) configured to expand the program, and the like. The computer (or the CPU) reads the program from the recording media and executes the program. For the recording media, it is possible to use a "non-temporary physical medium", for example, a tape, a disk, a card, a semiconductor memory, a programmable logic circuit or the like. Moreover, the program may be supplied to the computer through an optional transmission medium capable of transmitting the program (a communication network, a broadcast wave or the like). One or more embodiments of the present invention can also be implemented by a configuration of a data signal embedded in a carrier through which the program is materialized by electronic transmission.

The present invention is not restricted to the embodiments described above but various changes can be made within the scope described in claims. Embodiments obtained by properly combining the technical units disclosed in the different embodiments respectively are also included in the technical scope of the present invention.

One or more embodiments of the present invention can be applied to an apparatus configured to carry out zoom processing for a displayed image. For example, one or more embodiments of the present invention can be applied to a digital still camera or an information terminal with a camera (a notebook type PC, a tablet type PC or a smart phone). Moreover, one or more embodiments of the present invention can also be applied to an information terminal having an image browsing function (a notebook type PC, a tablet type PC or a smart phone).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An image display apparatus configured to zoom display an image to be displayed on a display area, comprising:
    a position specifying unit that specifies a position of an object contained in a displayed image;
    a position deciding unit that decides a positional relationship between an outer frame of the display area and the position of the object;
    a zoom speed changing unit that changes a zoom speed in the zoom display depending on the decided positional relationship; and
    an elapsed time deciding unit that decides while a zoom is in progress whether a predetermined time has passed or not since a decrease in the zoom speed,
    wherein the zoom speed changing unit increases the zoom speed in the zoom display if the predetermined time has passed since the decrease in the zoom speed.

2. The image display apparatus according to claim 1,
wherein the position deciding unit decides whether or not the outer frame of the display area and the position of the object are within a predetermined distance in the display area as the positional relationship between the outer frame of the display area and the position of the object, and
wherein the zoom speed changing unit decreases the zoom speed in the zoom display if the outer frame of the display area and the position of the object are within the predetermined distance.

3. The image display apparatus according to claim 2, wherein the zoom speed changing unit switches the zoom speed into a predetermined lower zoom speed if the outer frame of the display area and the position of the object are within the predetermined distance.

4. The image display apparatus according to claim 2, wherein the zoom speed changing unit gradually decreases the zoom speed depending on the positional relationship between the outer frame of the display area and the position of the object.

5. The image display apparatus according to claim 2, wherein the zoom speed changing unit sets the zoom speed to zero for a predetermined period.

6. The image display apparatus according to claim 2, wherein a zoom amount control unit decreases a zoom amount such that the object will no longer protrude from the outer frame of the display area when it is determined that the position of the object protrudes from the outer frame of the display area when the zoom display is carried out at the zoom amount.

7. The image display apparatus according to claim 2,
wherein the position deciding unit decides whether or not the position of the object is separated from the outer frame of the display area by a predetermined distance at an outside of the display area as the positional relationship between the outer frame of the display area and the position of the object, and
wherein the zoom speed changing unit increases the zoom speed in the zoom display if the position of the object is separated from the outer frame of the display area.

8. The image display apparatus according to claim 1, further comprising:
a dividing unit that divides the display area into a plurality of divided areas in a predetermined composition,
wherein the position deciding unit decides the position of the object in the divided areas.

9. An image display apparatus configured to zoom display an image to be displayed on a display area, comprising:
a dividing unit that divides the display area into a plurality of divided areas in a predetermined composition;
a position specifying unit that specifies a position of an object contained in a displayed image;
a position deciding unit that decides a positional relationship between a boundary between the divided areas and the position of the object;
a zoom speed changing unit that changes a zoom speed in the zoom display depending on the decided positional relationship; and
an elapsed time deciding unit that decides while a zoom is in progress whether a predetermined time has passed or not since a decrease in the zoom speed,
wherein the zoom speed changing unit increases the zoom speed in the zoom display if the predetermined time has passed since the decrease in the zoom speed.

10. A method of controlling an image display apparatus configured to zoom display an image to be displayed on a display area, comprising:
specifying a position of an object contained in a displayed image;
deciding a positional relationship between an outer frame of the display area and the position of the object;
changing a zoom speed in the zoom display depending on the decided positional relationship; and
deciding while a zoom is in progress whether a predetermined time has passed or not since a decrease in the zoom speed,
wherein the zoom speed changing unit increases the zoom speed in the zoom display if the predetermined time has passed since the decrease in the zoom speed.

11. A method of controlling an image display apparatus configured to zoom display an image to be displayed on a display area, comprising:
dividing the display area into a plurality of divided areas in a predetermined composition;
specifying a position of an object contained in a displayed image;
deciding a positional relationship between a boundary between the divided areas and the position of the object;
changing a zoom speed in the zoom display depending on the decided positional relationship; and
deciding while a zoom is in progress whether a predetermined time has passed or not since a decrease in the zoom speed,
wherein the zoom speed changing unit increases the zoom speed in the zoom display if the predetermined time has passed since the decrease in the zoom speed.

12. An image display program stored on a non-transitory computer-readable medium configured to zoom display an image to be displayed on a display area and that causes a computer to perform:
specifying a position of an object contained in a displayed image;
deciding a positional relationship between an outer frame of the display area and the position of the object;
changing a zoom speed in the zoom display depending on the decided positional relationship; and
deciding while a zoom is in progress whether a predetermined time has passed or not since a decrease in the zoom speed,
wherein the zoom speed changing unit increases the zoom speed in the zoom display if the predetermined time has passed since the decrease in the zoom speed.

13. An image display program stored on a non-transitory computer-readable medium configured to zoom display an image to be displayed on a display area and that causes a computer to perform:
dividing the display area into a plurality of divided areas in a predetermined composition;
specifying a position of an object contained in a displayed image;
deciding a positional relationship between a boundary between the divided areas and the position of the object;
changing a zoom speed in the zoom display depending on the decided positional relationship; and
deciding while a zoom is in progress whether a predetermined time has passed or not since a decrease in the zoom speed, wherein the zoom speed changing unit increases the zoom speed in the zoom display if the predetermined time has passed since the decrease in the zoom speed.

14. Imaging equipment comprising:
an imaging unit that picks up an image of a subject; and
the image display apparatus according to claim 1,
wherein an image obtained by the imaging unit is displayed on the display area.

15. The image display apparatus according to claim 3, wherein the zoom speed changing unit sets the zoom speed to zero for a predetermined period.

16. The image display apparatus according to claim 4, wherein the zoom speed changing unit sets the zoom speed to zero for a predetermined period.

17. The image display apparatus according to claim 3,
wherein the position deciding unit decides whether or not the position of the object is separated from the outer frame of the display area by a predetermined distance at an outside of the display area as the positional relationship between the outer frame of the display area and the position of the object, and
wherein the zoom speed changing unit increases the zoom speed in the zoom display if the position of the object is separated from the outer frame of the display area.

18. The image display apparatus according to claim 4,
wherein the position deciding unit decides whether or not the position of the object is separated from the outer frame of the display area by a predetermined distance at an outside of the display area as the positional relationship between the outer frame of the display area and the position of the object, and
wherein the zoom speed changing unit increases the zoom speed in the zoom display if the position of the object is separated from the outer frame of the display area.

* * * * *